United States Patent
Wells et al.

(10) Patent No.: US 10,724,864 B2
(45) Date of Patent: Jul. 28, 2020

(54) STEP DETECTION METHODS AND APPARATUS

(71) Applicant: Chief Architect Inc., Coeur d'Alene, ID (US)

(72) Inventors: Greg Wells, Coeur d'Alene, ID (US); Chris Tenbrink, Coeur d'Alene, ID (US); Carl Wieland, Coeur d'Alene, ID (US)

(73) Assignee: Chief Architect Inc., Coeur d'Alene, ID (US)

( * ) Notice: Subject to any disclaimer, the term of this patent is extended or adjusted under 35 U.S.C. 154(b) by 988 days.

(21) Appl. No.: 14/307,268

(22) Filed: Jun. 17, 2014

(65) Prior Publication Data
US 2015/0362520 A1 Dec. 17, 2015

(51) Int. Cl.
| | | |
|---|---|---|
| G01C 19/00 | (2013.01) | |
| G01C 21/16 | (2006.01) | |
| G06T 19/00 | (2011.01) | |
| G06F 3/01 | (2006.01) | |
| G06F 3/0346 | (2013.01) | |

(52) U.S. Cl.
CPC .............. *G01C 19/00* (2013.01); *G01C 21/16* (2013.01); *G06F 3/011* (2013.01); *G06F 3/0346* (2013.01); *G06T 19/003* (2013.01)

(58) Field of Classification Search
CPC ........... G01C 19/00; G01C 21/16; G06F 3/00; G06F 3/011; G06F 3/0346; G06T 19/003
USPC ........................................................ 702/141
See application file for complete search history.

(56) References Cited

U.S. PATENT DOCUMENTS

| | | | |
|---|---|---|---|
| 5,583,776 A | 12/1996 | Levi | |
| 7,610,181 B2 | 10/2009 | Simpson | |
| 8,049,762 B2 | 11/2011 | Wells | |
| 9,575,564 B2 * | 2/2017 | Wells | G06F 3/017 |
| 9,589,354 B2 * | 3/2017 | Wells | G06F 3/017 |
| 9,595,130 B2 * | 3/2017 | Wells | G06T 15/20 |
| 2002/0140666 A1 | 10/2002 | Bradski | |
| 2004/0064286 A1 | 4/2004 | Levi | |

(Continued)

FOREIGN PATENT DOCUMENTS

| | | | | |
|---|---|---|---|---|
| CN | 103727959 | * | 4/2014 | ............. G01C 22/00 |
| WO | WO 2013/048329 | | 4/2013 | |
| WO | WO 2013/122536 | | 8/2013 | |

OTHER PUBLICATIONS

Unity Technologies, "Unity", URL www.unity3d.com, Jun. 16, 2014, 2 pages.

(Continued)

*Primary Examiner* — Michael P Nghiem
*Assistant Examiner* — Dacthang P Ngo
(74) *Attorney, Agent, or Firm* — Wells St. John P.S.

(57) ABSTRACT

Step detection methods and apparatus are described. According to one aspect, a footstep detection method includes obtaining accelerometer data regarding movements of a user device, filtering the accelerometer data to remove frequencies above a typical stepping frequency range of a user, after the filtering, analyzing individual ones of a plurality of cycles of the accelerometer data to determine whether any of the individual cycles corresponds to a user taking a footstep with the user device, and as a result of the analyzing, indicating at least one of the individual cycles as corresponding to the user taking a footstep.

30 Claims, 12 Drawing Sheets

(56) References Cited

U.S. PATENT DOCUMENTS

| | | |
|---|---|---|
| 2004/0135744 A1 | 7/2004 | Bimber |
| 2005/0231532 A1 | 10/2005 | Suzuki et al. |
| 2006/0050070 A1 | 3/2006 | Matsui |
| 2007/0135690 A1 | 6/2007 | Nicholl |
| 2007/0208544 A1* | 9/2007 | Kulach ............... A61B 5/1112 702/189 |
| 2007/0219645 A1 | 9/2007 | Thomas et al. |
| 2008/0172204 A1* | 7/2008 | Nagashima .......... G01C 22/006 702/160 |
| 2010/0045703 A1 | 2/2010 | Kornmann |
| 2010/0103096 A1 | 4/2010 | Yamamoto |
| 2010/0156906 A1 | 6/2010 | Montgomery |
| 2010/0182400 A1 | 7/2010 | Nelson et al. |
| 2010/0188503 A1 | 7/2010 | Tsai |
| 2011/0178759 A1* | 7/2011 | Uchida ............... G01C 22/006 702/141 |
| 2011/0210962 A1 | 9/2011 | Horan |
| 2011/0216060 A1 | 9/2011 | Weising |
| 2012/0075285 A1 | 3/2012 | Oyagi et al. |
| 2012/0229453 A1 | 9/2012 | Hayashi |
| 2012/0229513 A1 | 9/2012 | Hayashi |
| 2013/0085677 A1 | 4/2013 | Modi et al. |
| 2013/0085700 A1 | 4/2013 | Modi et al. |
| 2013/0085711 A1 | 4/2013 | Modi et al. |
| 2013/0222647 A1 | 8/2013 | Ishihara |
| 2013/0321401 A1 | 12/2013 | Piemonte |
| 2014/0074431 A1 | 3/2014 | Modi |
| 2014/0095122 A1 | 4/2014 | Appleman |
| 2015/0363965 A1 | 12/2015 | Wells et al. |
| 2015/0363966 A1 | 12/2015 | Wells et al. |
| 2015/0363967 A1 | 12/2015 | Wells et al. |
| 2016/0018225 A1* | 1/2016 | Yang ..................... G01C 21/16 702/150 |
| 2016/0298984 A1* | 10/2016 | Liu ...................... G01C 22/006 |

OTHER PUBLICATIONS

13th Lab, available online at https://web.archive.org/web/20140301003938/http:/13thlab.com/, Mar. 1, 2014, 3 pages.

Davison et al., "MonoSLAM: Real-Time Single Camera SLAM", IEEE Transactions on Pattern Analysis and Machine Intelligence vol. 29, No. 6, Jun. 2007, United States, 16 pages.

PointCloud SDK, available online at https://web.archive.org/web/20121227121720/http:/developer.pointcloud.ic/sdkdocs/index.html, Dec. 27, 2012, 2 pages.

SoftPlan—Using SoftPlan Review, available online at http://www.softplan.com/reviewmgt/UsingSoftPlanReview.html, Oct. 2014, 14 pages.

SoftPlan Architectural Design Software, available online at https://web.archive.org/web/20140210024442/http://www.softplan.com/SoftPlan-reView.html, Feb. 10, 2014, 2 pages.

ViewAR—Augmented Reality Quick Start Guide, available online at http://www.viewar.com/wp-content/uploads/2014/08/ViewAR_Augmented_Reality_Quick_Start.pdf, Aug. 2014, 22 pages.

ViewAR, available online at http://web.archive.org/web/201405302316258/http://www.viewar.com/, May 30, 2014, 2 pages.

\* cited by examiner

STEP DETECTION METHODS AND APPARATUS

TECHNICAL FIELD

This disclosure relates to step detection methods and apparatus.

BACKGROUND OF THE DISCLOSURE

Three-dimensional computer graphics technology is often used in architectural design applications, mechanical design applications, and games to allow a user to create, view, and navigate a virtual scene. More recently, the sophistication and capabilities of mobile computing devices have increased significantly and many devices are capable of executing applications which were previously executed on desktop machines such as personal computers.

The present disclosure is directed towards methods and apparatus to enable a user to navigate virtual models, such as virtual models of architectural structures, and additional methods and apparatus related thereto which are described in detail below according to example embodiments of the disclosure.

BRIEF DESCRIPTION OF THE DRAWINGS

Example embodiments of the disclosure are described below with reference to the following accompanying drawings.

DETAILED DESCRIPTION OF THE DISCLOSURE

Figure 1:
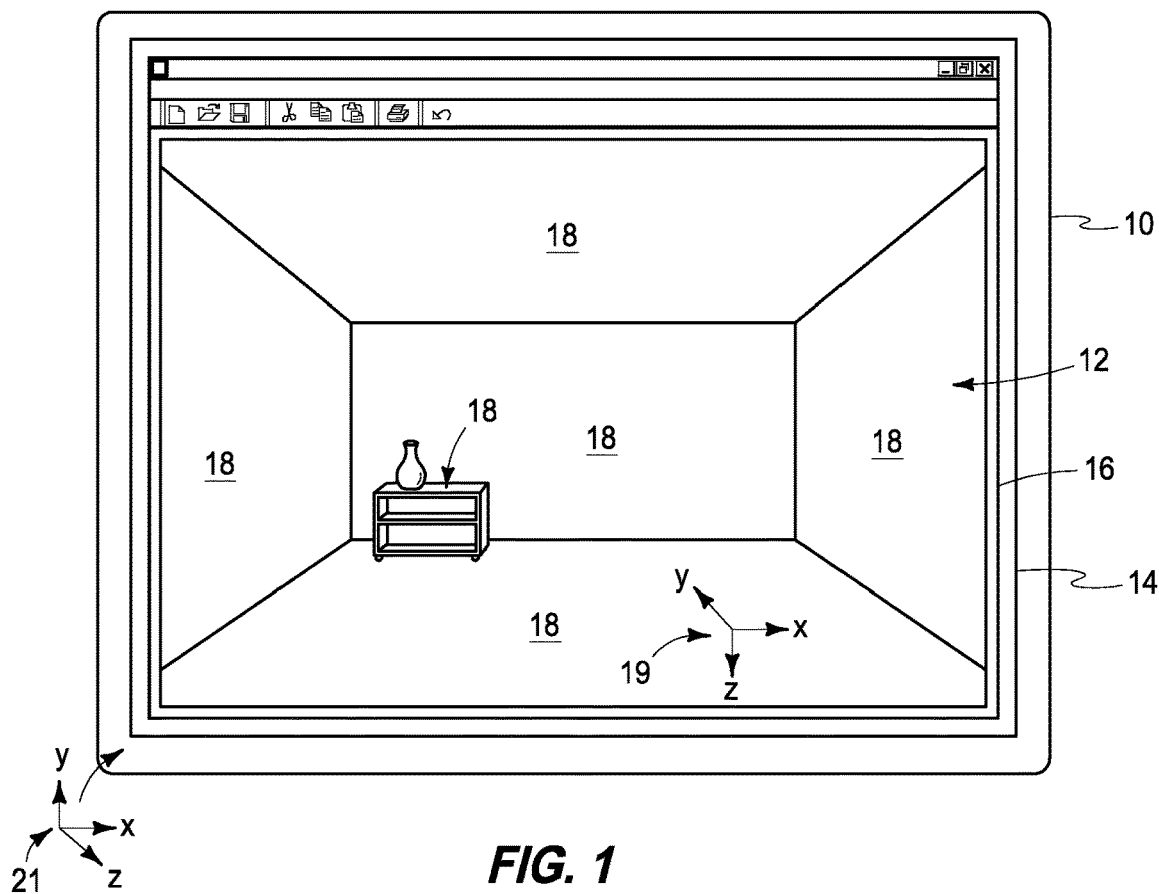
FIG. 1 is an illustrative representation of a view of a virtual scene generated by a user device according to one embodiment.

This disclosure is submitted in furtherance of the constitutional purposes of the U.S. Patent Laws "to promote the progress of science and useful arts" (Article 1, Section 8).

The reader is directed to the following applications which were filed the same day as the present application: "Virtual Model Navigation Methods and Apparatus", naming Greg Wells, Chris Tenbrink, Carl Wieland and Dan DeBroeck as inventors, and having application Ser. No. 14/307,117, now U.S. Pat. No. 9,575,564; "Virtual Model Viewing Methods and Apparatus", naming Greg Wells, Chris Tenbrink, Carl Wieland and Dan DeBroeck as inventors, and having application Ser. No. 14/307,183, now U.S. Pat. No. 9,589,354; and "Virtual Model Navigation Methods and Apparatus", naming Greg Wells, Chris Tenbrink and Carl Wieland as inventors, and having application Ser. No. 14/307,242, now U.S. Pat. No. 9,595,130, and the teachings of which are incorporated herein by reference.

In some embodiments, a footstep detection method comprises obtaining accelerometer data regarding movements of a user device, filtering the accelerometer data to remove frequencies above a typical stepping frequency range of a user, after the filtering, analyzing individual ones of a plurality of cycles of the accelerometer data to determine whether any of the individual cycles corresponds to a user taking a footstep with the user device, and as a result of the analyzing, indicating at least one of the individual cycles as corresponding to the user taking a footstep.

Some of the aspects of the disclosure are directed towards method and apparatus for generating and navigating virtual models, such as three-dimensional (3D) virtual models, which may be displayed and interacted with using a computing system. At least some embodiments described below are directed towards generating and navigating virtual models of architectural structures (e.g., houses) although the described embodiments may be utilized to generate and interact with other virtual models in other examples, and perhaps having vastly different scales (e.g., virtual models of the human circulatory system, an internal combustion engine, etc.).

As described further below, some illustrative aspects of the disclosure are directed towards utilization of data from sensors of a user device, which detect movements (translations and rotations) of the user device, to navigate a plurality of different views of a virtual model which are displayed using the user device. Example user devices include mobile computing devices, such as tablet computers, cellular telephones, smartphones, laptop computers, eyewear computing devices (e.g., Google Glass™, etc.) as well as other computing devices, such as desktop personal computers or workstations.

Additional aspects of the disclosure are directed towards combining content of the physical (real) world with virtual content of the virtual model as described in example embodiments below. The discussion proceeds below with respect to describing example systems and methods to generate different views of virtual models during user navigation of the virtual model using an example computing device.

In one embodiment, three-dimensional computer graphics technology is utilized to allow a user to create, view, and navigate a virtual model. A virtual scene includes information regarding the virtual model and a virtual camera which is used to generate views of the virtual model which are displayed for the user. The virtual scene contains information utilized by the computer graphics technology to produce an image on the screen that represents the virtual model stored in computer memory. For example, the virtual scene may include information about geometric objects, their materials, and lights used to illuminate them.

In one implementation, an architectural computer-aided design (CAD) system is used to design and/or modify a virtual model, such as a virtual model of an architectural structure (e.g., Chief Architect and Room Planner products available from Chief Architect, Inc.), and some embodiments of the disclosure enable users to navigate the virtual model including controlling the generation of desired views of the virtual model. In some embodiments disclosed herein, a graphics engine, such as Unity available from Unity Technologies, San Francisco, Calif. (e.g., www.unity3d.com), is used. Different methods or systems may be used to navigate virtual models and create different views of the virtual model in other embodiments.

In one example, the virtual scene is composed of a set of objects and each object includes a set of components that specify how the object appears in the virtual scene. For example, an object may include a transform which defines the object's position, orientation, and scale with respect to some parent transform. In the most basic case, an object's transform has no parent and the object's transform defines the object's position, orientation, and scale, with respect to a virtual scene's global origin. In a more complicated case, an object's transform may have some other transform as its parent which means that the object's position, orientation, and scale are a function of the parent transform. In this way, a hierarchy of transforms can be created and each transform in the hierarchy gets evaluated to determine the final position, orientation and scale of the object in a given view of the virtual model.

In one illustrative example, a virtual model of a bicycle may be created where the bicycle frame is an object that contains transform T1 and coordinates for all parts of the frame are given with respect to transform T1. The wheels are also objects containing transforms T2 and T3, and coordinates for the wheel geometry are given with respect to these two transforms. The wheels are positioned and oriented with respect to the frame by defining their offset and orientation with respect to their parent transform, T1. The whole assembly is positioned and oriented in the scene by specifying the position and orientation of T1, which has no parent or may have a scene level parent.

Objects can contain other components besides transforms. For example, a mesh is a component that defines the 3D geometry of the object using a set of 3D vertices and a set of connections between the vertices. Usually, the connections between vertices produce a set of triangles which are used to represent the surfaces of objects that are intended to be shown in the virtual scene.

Referring to FIG. 1, a computing device or system, which may be utilized as a user device 10, is shown displaying an example view 12 of an interior room of a virtual model in the form of an architectural structure. Example computing devices or systems (e.g., personal computers) are configured to display images for observation by a user and include processing circuitry configured to control the generation and display of the images. The computing devices or systems may be portable in some arrangements, such as the mobile computing devices discussed above.

The user device 10 includes a display screen 14 which may be used to generate visual images for viewing by the user. The display screen 14 may also be interactive to function as a user interface (e.g., graphical user interface) which is configured to receive user inputs via a user touching the display screen 14 in some embodiments. In the example of FIG. 1, the display screen 14 depicts an image in the form of a window 16 which corresponds to an application being executed by the user device 10 and which includes the view 12 of the virtual model in a respective video frame.

In one embodiment, each wall, floor, ceiling, window, door, and furniture piece (and other items) of a virtual model of an architectural structure is an object 18 containing a mesh (only some of these objects are shown in FIG. 1). In some embodiments, a scene coordinate reference frame or system 19 of the virtual model is at least partially aligned (aligned in x, y plane) with a global coordinate reference frame or system of the physical world such that the foundation of the architectural structure is shown below the roof in views of the virtual model. In some embodiments, locations of the virtual model correspond to locations in the physical world. The floor object 18 of the architectural structure may be referred to as a base plane and which may be defined in a x, y plane (i.e., the footprint of the structure) and the walls of the structure may extend upwards along the z axis from the x, y plane. In some embodiments, the scene and global coordinate reference frames are completely aligned (e.g., a North direction of the architectural structure is aligned with a North direction of the physical world).

As discussed below in some embodiments, the user device 10 has a respective device coordinate reference frame or system 21 and translations of the user device 10 are monitored relative to the device coordinate reference frame and rotations of the user device 10 are monitored relative to the global coordinate reference frame in one embodiment. The scene coordinate reference frame 19 is left-handed and the device coordinate reference frame 21 is right-handed in one embodiment.

In addition to use of 3D coordinates of the scene coordinate reference frame to define its position in virtual space, each vertex in the mesh also has a set of three numbers that define a normal vector for the vertex in one embodiment. The normal vector represents the normal of the surface which the mesh is approximating at the location of the vertex in one embodiment.

Also, in one embodiment, each vertex can contain a set of texture coordinates so when a 2D image is attached to the object, the texture coordinates define a location on the 2D image that should be mapped to the vertex location when the mesh is rendered. In this way, an image may be applied to a mesh to add graphical details that would be difficult to model geometrically with portions of the mesh. Each vertex in the mesh can also contain position coordinates and a normal vector.

One example method for implementing navigation of virtual models is discussed below with use of the Unity graphics engine. More specifically, the Unity graphics engine provides an object for a virtual camera through which a user views the virtual model. For example, different views of the virtual model may be drawn in frames using the virtual camera which are snapshots of the virtual scene at respective moments in time. The virtual camera is considered to be within the virtual scene of the virtual model in one embodiment. The virtual camera contains a transform to define its view point (position) and view direction (orientation) with respect to the rest of the scene in the scene coordinate reference frame. The view point position may be defined in three coordinates in the scene coordinate reference frame and the view direction may be defined as an orientation in the scene coordinate reference frame. The views of the virtual model change as one or both of the view point and view direction of the virtual camera change. The view point location and/or orientation of a virtual camera within the virtual scene may be changed as a result of inputs and these changes result in changes of the view of the virtual model. Example user inputs include inputs entered via user controls of the user device including the graphical user interface (or other appropriate interface such as a mouse or keyboard of the user device) and/or inputs generated by movements (e.g., rotations and translations) of the user device as described further in example embodiments below.

Figure 1A:
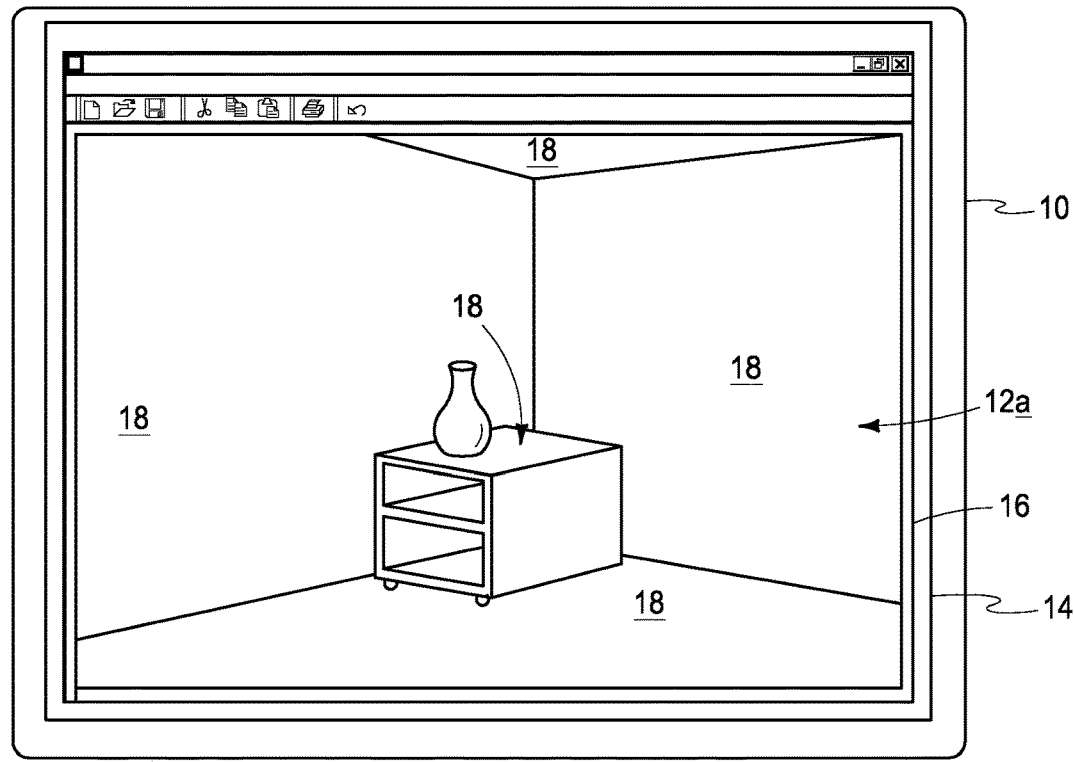
FIG. 1A is an illustrative representation of another view of a virtual scene generated by a user device according to one embodiment.

As described in some example embodiments herein, user inputs received via a user control (e.g., joystick), inputs from location sensors, and/or inputs resulting from translations and rotations of the user device may result in the change of the view point and/or view direction of the virtual camera resulting in different views 12 of the virtual model. As shown in FIGS. 1 and 1A, different portions of the virtual model are shown in different views 12, 12a resulting from a change in the view point and/or view direction of the virtual camera.

By convention in Unity, the virtual camera is oriented so that the user is looking along the positive z axis of the transform with the positive y axis of the transform defining the 'up' direction. The virtual camera's position and/or orientation in the scene can be changed by modifying its transform. The virtual camera also has other parameters that effect how the scene is displayed in views (e.g., Field of View, near and far clipping plane distances, whether the projection is orthographic or perspective).

The Unity graphics engine performs an initial setup of a virtual scene, such as for a house, upon start-up. This consists of instantiating an object for the various existing elements of a plan of the house which have been stored in a database during a previous session or otherwise accessed. For example, an object with a mesh is created for each wall in the virtual model of the home. In the same way, objects for each furniture item, window and door in the virtual model are instantiated. Additionally, an object for the virtual camera is created and its transform is modified to place it at some predefined position (i.e., view point within the virtual scene) and orientation (i.e., view direction within the virtual scene) with respect to the other objects in the virtual scene.

Once all of the objects have been setup, the Unity graphics engine performs a series of calculations that uses information stored with all of the objects in the virtual scene to determine what color each pixel on the display screen should be set to. The Unity graphics engine draws a picture of the virtual scene as a view of the virtual model on the display screen at a particular instant as a frame, for example as a video frame.

A single update of the display screen is referred to as a frame update. User device 10 can perform these calculations sufficiently fast that frames of the display screen can be redrawn at a plurality of different moments in time (e.g., a frame rate between 15 and 150 times per second in one example), which is sufficient to produce the illusion of movement in the virtual scene typical of video.

The Unity graphics engine allows scripts to be connected as components to objects. This provides a method for programmatically defining the behavior of objects. On each frame update, the Unity graphics engine iterates over all of the objects in the view to be drawn, looking for objects with an attached script. When it finds an attached script, the Unity graphics engine invokes the 'Update' method defined in the script (if the method exists). The 'Update' method can be defined by the application developer to query and modify data in the application to produce a particular behavior. For example, the 'Update' method in the script attached to the virtual camera object might rotate the camera's transform by 1 degree around the y axis in the scene coordinate reference frame. In this way, the virtual camera would rotate slightly with each frame update, producing the sensation of motion.

The Unity graphics engine also allows scripts to access various sensors and input devices. For example, the Unity graphics engine provides an Application Programming Interface (API) for accessing user controls such as a keyboard and determining if particular keys of a keyboard or areas upon a touch sensitive display screen are pressed. In a similar manner, mouse movements and clicks, and joystick movements and button presses can be accessed. Also, the Unity graphics engine provides a method for obtaining readings from sensors (e.g., gyroscope sensors and accelerometer sensors) of a user device 10. Alternatively, readings from the sensors may be obtained using code of the operating system of the user device 10. Data from different ones or combinations of these inputs may be used in different embodiments to provide logic in scripts to change the way the virtual scene appears in the different views.

Continuing the example above, a script could be written with an 'Update' method that queries the keyboard to determine if the 'left-arrow' key is depressed. If the key is depressed, the script could update the camera's transform to rotate it one degree about the y axis. This provides a means for the user to control the orientation of the virtual camera in the virtual scene and generation of different views by pressing the 'left-arrow' key.

Traditionally, users have interacted with 3D graphics applications using a mouse and keyboard. Many modern user devices include an application programming interface (API) for accessing sensor data from the sensors of the user device 10. As discussed in example embodiments below, this sensor data can be used to interact with the 3D environment of the virtual scene displayed in different views on the display screen of the user device 10. Some example embodiments describe apparatus and methods which allow the user to feel more immersed in the virtual environment compared with other interaction methods while enabling the user to be simultaneously connected to and taking cues from the physical environment.

In one embodiment, processing circuitry 34 controls the generation of the plurality of different views of the virtual model as the user navigates the virtual model. The views are drawn in a plurality of respective frames and may show different portions of the virtual model as the user navigates the virtual model. As described below, user inputs entered via user controls of the user device including the graphical user interface (or other appropriate interface such as a mouse or keyboard of the user device) and/or inputs generated by physical movements (e.g., rotations and translations) of the user device are utilized to navigate the virtual model and control the different portions of the virtual model which are presented in the different views. The redrawing of frames upon the display device 32 is sufficiently fast in at least one embodiment to create a video playback experience to the user while navigating the virtual model. In some embodiments, the views of the virtual model are adjusted in real time as the user enters inputs into the user device via user controls and/or translates or rotates the user device.

Referring to FIG. 1A, another virtual scene 12a is shown resulting from the virtual camera being positioned at a different view point and view direction compared with the view point and view direction of the virtual camera used to draw the frame of FIG. 1. In the illustrated example of FIG. 1A, the view point of the virtual camera has been moved closer to the furniture object and the view direction of the virtual camera has been rotated to the left compared with the virtual scene 12 of FIG. 1.

Figure 2:
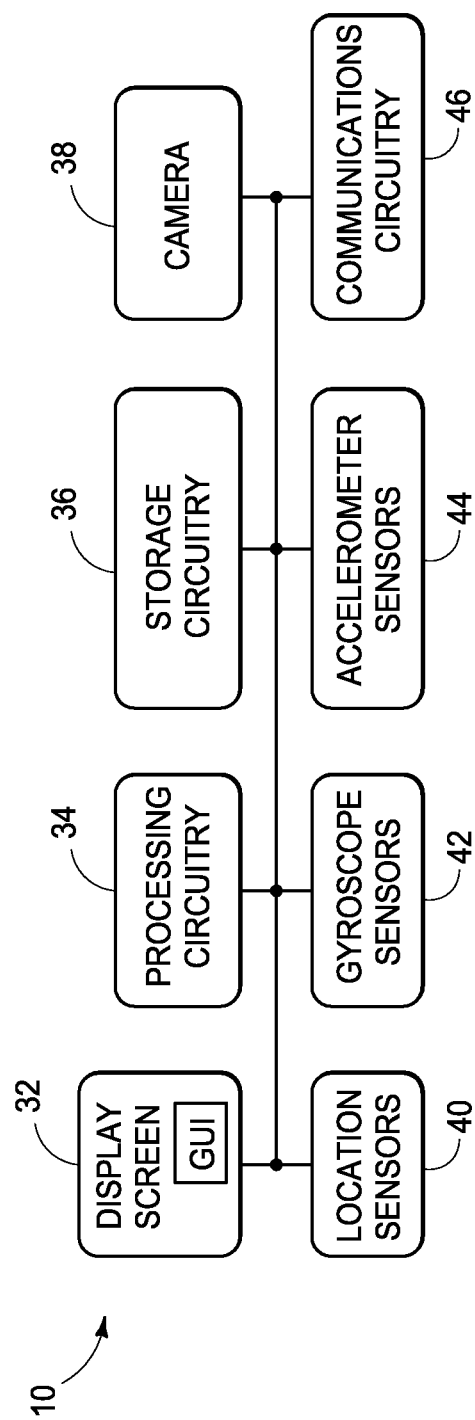
FIG. 2 is a functional block diagram of a user device according to one embodiment.

Referring to FIG. 2, one embodiment of hardware components of a computing system or device which may be utilized as a user device 10 is shown. In the illustrated example embodiment, the user device 10 includes a display screen 32, processing circuitry 34, storage circuitry 36, a camera 38, location sensors 40, gyroscope sensors 42, accelerometer sensors 44, and communications circuitry 46. Other embodiments of the computing system or device are possible including more, less and/or alternative components. For example, the user device may include a magnetometer to measure the alignment of the device with respect to the Earth's magnetic field and a range camera which provides distance information for pixels of captured images.

Display screen 32 is configured to interact with a user including conveying data to a user (e.g., depicting visual images for observation by the user) as well as receiving inputs from the user, for example, via a touch sensitive screen interface. Display screen 32 is configured as a user input device or control in the form of a graphical user interface (GUI) and which may directly receive user entered inputs in one embodiment. Although not shown, the user device may include additional associated user input devices or controls, such as a mouse, keyboard, etc., for directly receiving user entered inputs as mentioned above.

In one embodiment, processing circuitry 34 is arranged to process data, control data access and storage, issue commands, control the display of images. Processing circuitry 34 may additionally control other operations discussed herein including navigation of virtual models and displaying different views of the virtual models during navigation.

Processing circuitry 34 may comprise circuitry configured to implement desired programming provided by appropriate computer-readable storage media in at least one embodiment. For example, the processing circuitry 34 may be implemented as one or more processor(s) and/or other structure configured to execute executable instructions including, for example, software and/or firmware instructions. Other example embodiments of processing circuitry 34 include hardware logic, PGA, FPGA, ASIC, state machines, and/or other structures alone or in combination with one or more processor(s). These examples of processing circuitry 34 are for illustration and other configurations are possible.

In some embodiments described herein, processing circuitry 34 is configured to detect movements (e.g., rotational and/or translational movements) of the user device 10 and to generate different views showing different virtual content of the virtual model as a result of the detected movement and which may correspond to the detected movement. In some embodiments, movement of the user device may be detected by monitoring outputs from accelerometer, gyroscope, and location sensors. In addition, a change in orientation or rotation may be detected or controlled along one or more of the axes of the respective coordinate reference frame.

Storage circuitry 36 is configured to store programming such as executable code or instructions (e.g., software and/or firmware), electronic data, model data of virtual models (e.g., architectural structures) to be navigated and interacted with and which is used to create different views of the virtual models during user navigation, databases, image data from camera 38 (or from other sources of content of the physical world, etc.) or other digital information and may include computer-readable storage media.

At least some embodiments or aspects described herein may be implemented using programming stored within one or more computer-readable storage medium of storage circuitry 36 and configured to control appropriate processing circuitry 34.

The computer-readable storage medium may be embodied in one or more articles of manufacture which can contain, store, or maintain programming, data and/or digital information for use by or in connection with an instruction execution system including processing circuitry 34 in one embodiment. For example, computer-readable storage media may be non-transitory and include any one of physical media such as electronic, magnetic, optical, electromagnetic, infrared or semiconductor media. Some more specific examples of computer-readable storage media include, but are not limited to, a portable magnetic computer diskette, such as a floppy diskette, a zip disk, a hard drive, random access memory, read only memory, flash memory, cache memory, and/or other configurations capable of storing programming, data, or other digital information.

Camera 38 is configured to generate image data of the physical world content including still photographs and video data and which may be stored using storage circuitry 36. In some embodiments described below, processing circuitry 34 may insert image data generated by the camera into views of the virtual model which are displayed using the display screen 32.

Location sensors 40 use GPS or triangulation of data network nodes in example embodiments to determine the user device's global location in the physical world, i.e., the global coordinate reference frame.

Gyroscope sensors 42 measure the orientation of the user device with respect to the global coordinate reference frame in the physical world as well as changes in the orientation of the user device. In one embodiment, three gyroscope sensors 42 monitor rotations about three orthogonal axes and provide gyroscope data indicative of the rotations of the user device 10 about these axes.

In one embodiment, three accelerometer sensors 44 sense accelerations along the three coordinate axes of the device coordinate reference frame of the user device.

Communications circuitry 46 is arranged to implement communications of user device 10 with respect to external devices (not shown). For example, communications circuitry 46 may communicate information bi-directionally with respect to user device 10 and include hardware for wired connections (e.g., network interface card (NIC), serial or parallel connections, USB port, Firewire interface), and/or circuitry for wireless connections (e.g., Bluetooth, Cellular, GPS, WiFi, etc.).

As described below in some embodiments, the user device uses data inputs from these example sensors to allow a user to view and navigate a virtual model in a more natural way than can be achieved through simple keyboard, mouse or touch screen manipulation.

Figure 3:
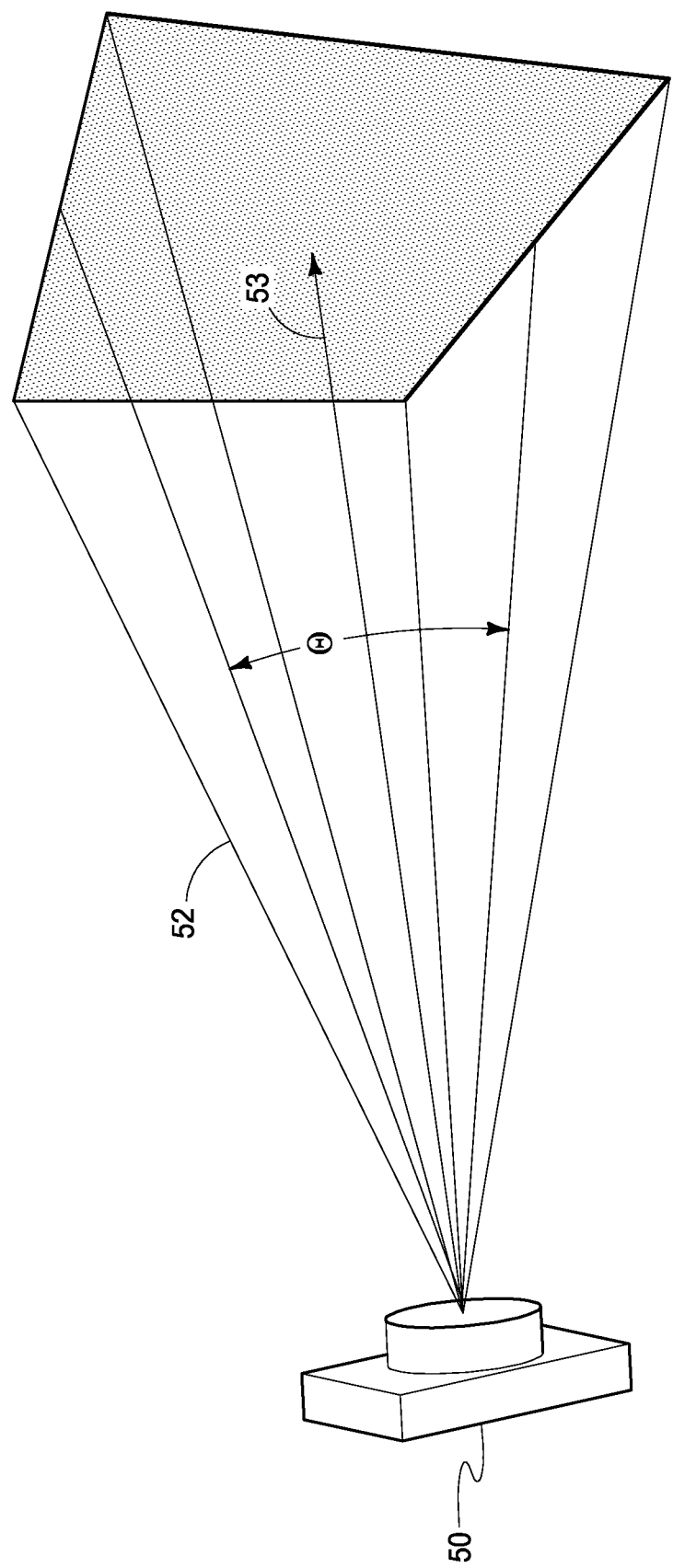
FIG. 3 is an illustrative representation of a camera and corresponding field of view according to one embodiment.

Referring to FIG. 3, an example camera 50 (such as camera 38, or a virtual camera utilized to generate views of a virtual model) is shown. A camera's field of view (FOV) defines how much of the scene (real or virtual) is visible in an image captured by the camera. Field of view (FOV) of the camera 50 is a square pyramid 52 in one example with its apex at the camera 50 and its axis parallel to the view direction of the camera. The shape of the pyramid is defined by two parameters including an angle (theta) between opposing triangular faces (usually the top and bottom faces) and an aspect ratio for the resulting image. The aspect ratio constrains the angle between the other two faces. In order to avoid distortion in the displayed image, the aspect ratio is generally chosen to match the aspect ratio of the display screen used to display the image.

As mentioned above, a virtual camera is used to control the generation of views of the virtual model in one embodiment. Various parameters of the virtual camera define how the views are generated. For example, the view point of the virtual camera specifies where the virtual camera is positioned within a virtual model relative to other objects of the virtual model. A view direction 53 specifies the direction in which the virtual camera is pointing in the virtual scene. Additional information may be provided regarding the orientation or rotation of the virtual camera within the virtual scene (e.g., information regarding azimuth rotations, elevation rotations, and twist rotations). The view direction 53 of the virtual camera is a vector emitted from the view point of the virtual camera at an orientation which is as specified by the orientation of the virtual camera in one embodiment.

Referring to camera 38 of the user device, the view direction of the camera 38 of the user device is a vector which is normal to the lens and passes through the center of the lens in one embodiment.

Different methods for interacting with the virtual model are provided in different embodiments. User inputs via user controls of the user device and/or data from sensors and circuitry of the user device control navigation of a virtual model as described in the example embodiments below. For example, these inputs change one or more of the view point (location of the virtual camera within a virtual scene) and view angle (orientation of the virtual camera within the virtual scene). These changes result in different views of the virtual model being displayed via the display screen 32.

Different operational modes utilize different ones of the inputs to control navigation of the virtual model including changing the view point and view direction of the virtual camera within the virtual scene of the virtual model.

Figure 4:
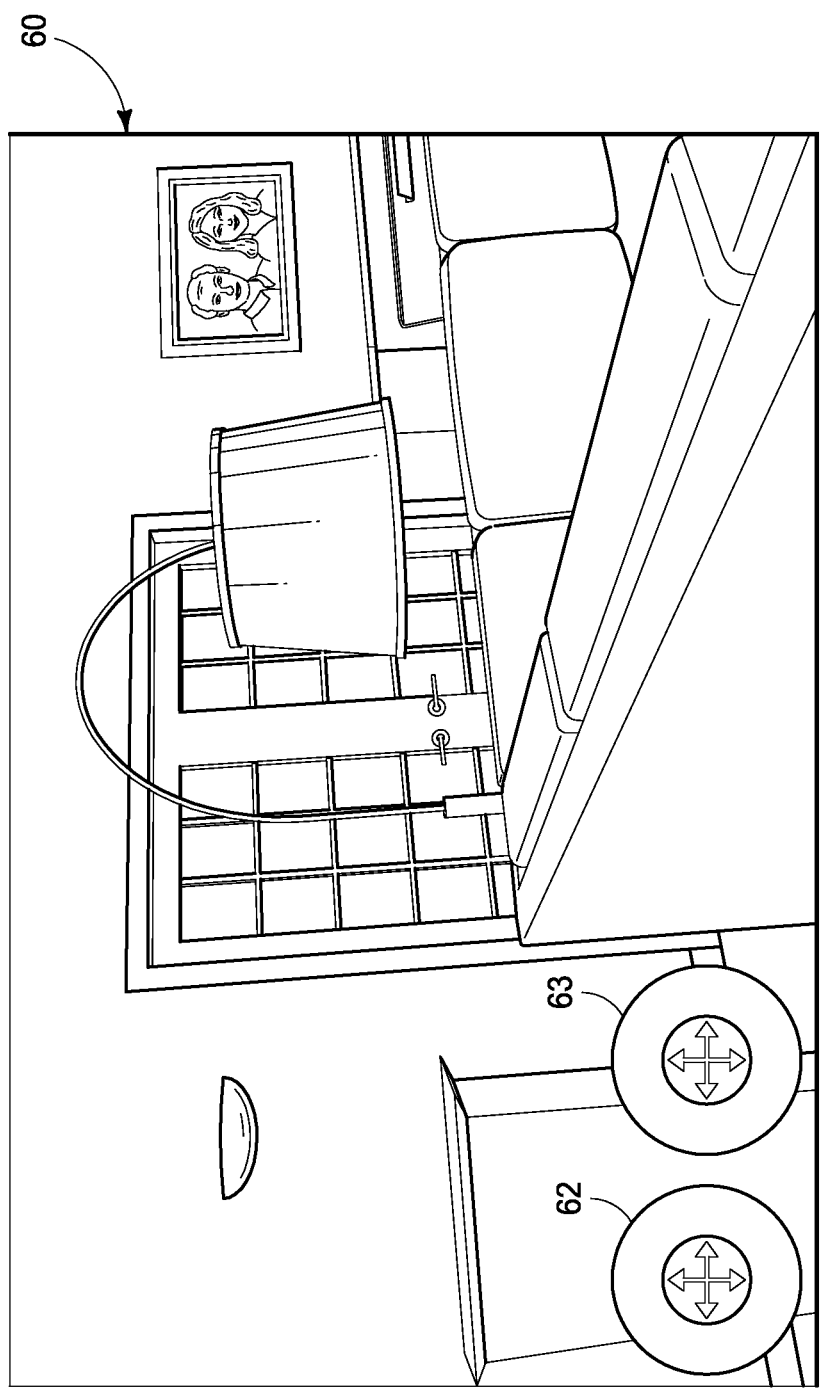
FIG. 4 is an illustrative representation of a view of a virtual scene generated by a user device according to one embodiment.

Referring to FIG. 4, a view 60 of a virtual model which may be displayed using the display screen of the user device is shown. The image of the view 60 generated upon the display screen also includes user controls in the form of joysticks 62, 63 in one operational mode. Gestures of a user's finger may interact with the joysticks 62, 63 upon the screen display to navigate the virtual model including changing the views of the virtual model. In one example, joystick 62 controls translation movements of the virtual camera in two degrees of freedom within the virtual scene and joystick 63 controls rotation movements of the virtual camera in two degrees of freedom within the virtual scene. In one implementation, the change in the position of the virtual camera is proportional to the displacement of the joystick from its home position. In other words, pushing the joystick further forward produces a sensation of translating or rotating faster.

In other operational modes, translation and rotational movements of the user device are detected and used to control navigation of the virtual model (alone or in combination with inputs entered by the user using controls).

Figure 5:
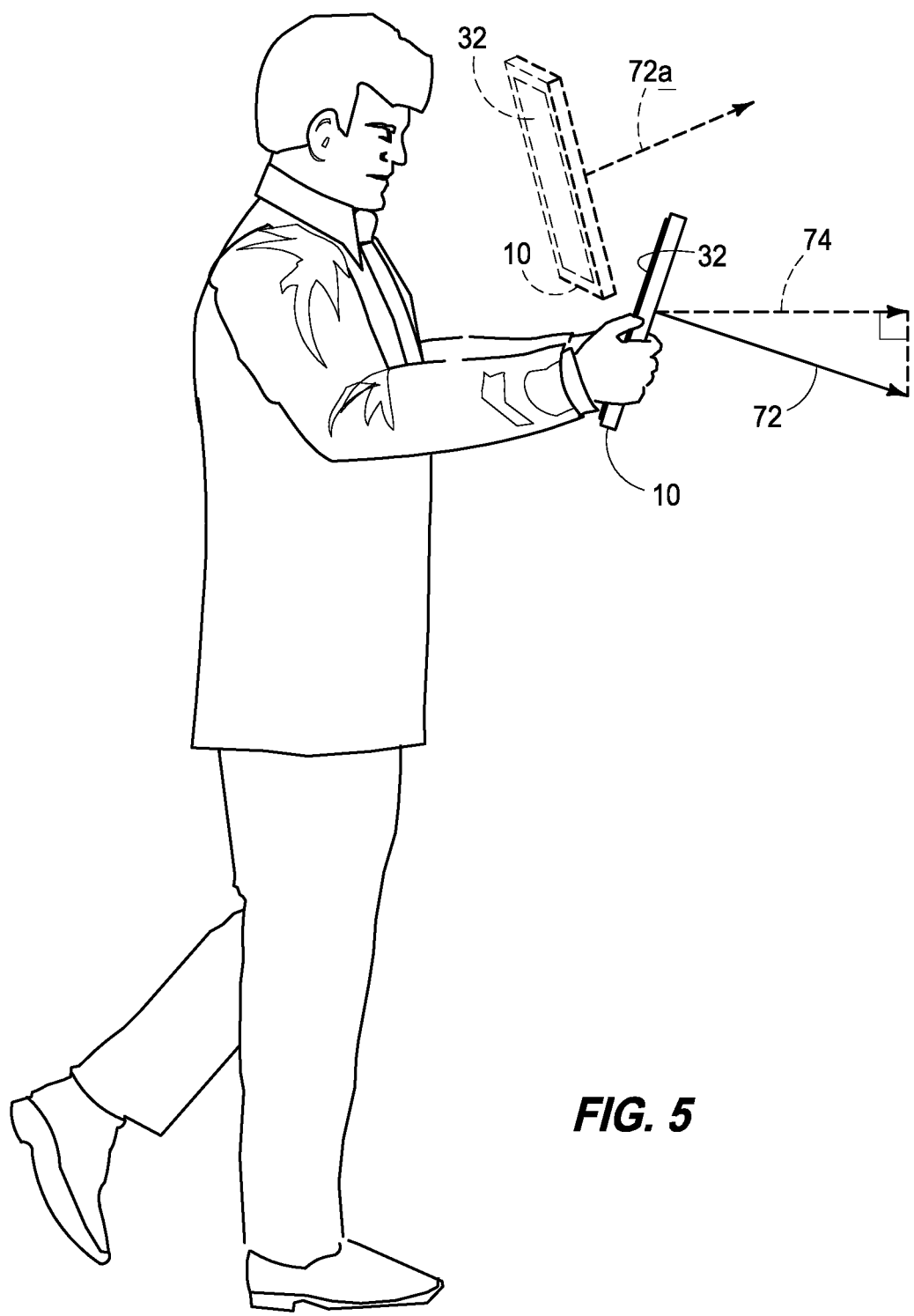
FIG. 5 is an illustrative representation of movements of a user and a user device according to one embodiment.

Referring to FIG. 5, a user is shown holding a user device 10, such as a tablet computer. During typical operation, the user may hold the user device 10 in front while observing images generated by the display screen 32 which include different views of the virtual model as the user translates and/or rotates the user device.

The user device 10 defines a view direction 72 which is normal to a plane which includes the display screen 32 and emanates outwardly from the user device in a direction opposite to the direction in which images displayed using the display screen 32 are viewed by the user in one embodiment. Movements of the user device 10 by the user in the physical world may be detected by one or more of the location sensors 40, gyroscope sensors 42, and accelerometer sensors 44 and used to navigate the virtual model including control of translation and rotation of the virtual camera within the virtual scene.

The rotational movements of the user device 10 change the view direction 72 of the device 10. For example, in FIG. 5, the user has rotated the user device 10 to the left and increased the elevation angle resulting in a change of the view direction 72a to the left and upwards. The view direction 72 of the user device 10 controls the view direction of the virtual camera within the virtual scene in some embodiments as described in further detail below. For example, data regarding the orientation or changes in orientation of the user device 10 (and view direction 72) in the physical world may be used to provide a corresponding orientation or changes in orientation of the virtual camera in the virtual scene. In an illustrative example, a user rotating with the user device 10 to the left 40 degrees in the physical world is detected by the gyroscope sensors 42 and used to control leftward rotation of the virtual camera 40 degrees within the virtual model.

In one embodiment, the orientation of the virtual camera is controlled or defined to be at an orientation within the scene coordinate reference frame of the virtual model which is the same as the orientation of the user device in the physical coordinate reference frame of the physical world (the view direction of the user device is the same as the view direction of the user device).

In one example embodiment, rotational offsets of the user device with respect to an initial orientation are calculated based upon subsequent rotations of the user device 10 and are used to control corresponding rotations of the virtual camera from an initial orientation to an updated orientation corresponding to the updated orientation of the user device.

In addition, the view direction 72 of the user device 10 may also control a direction of translation of the virtual camera within the virtual scene in some embodiments. In one example of this embodiment, changes in translations according to the view direction 72 of the user device 10 result in elevational changes of the virtual camera within the virtual scene (downward if the user device 10 is pointed below horizontal or upward if the user device 10 is pointed above horizontal).

In one example of this mode where the view direction of the virtual camera is controlled using rotations of the user device 10, forward and backward translations of the virtual camera in the view direction of the virtual camera are controlled by user inputs to the user controls (e.g., forward and backward movements of the translation joystick 62). As the user moves his finger to move the virtual joystick 62 forward, the virtual camera is translated forward along the view direction of the virtual camera within the virtual scene in the scene coordinate reference frame. If the view direction of the user device is pointing upwards above horizontal in the global coordinate reference frame, the virtual camera is translated upwards towards the ceiling of the virtual model in one illustrative example.

Accordingly, the elevation of the virtual camera within the virtual model may change during this operational mode. If the user points the user device as shown in FIG. 5 (downward relative to horizontal), and also moves joystick 62 forward, the virtual camera is translated forward and downward within the virtual scene corresponding to the downward angle of the view direction 72 and which would result in the virtual camera being positioned closer to the floor of the architectural structure (i.e., a lower elevation). Likewise, the user device 10 may be pointed upward so the view direction 72 is in a direction above horizontal and the elevation of the virtual camera is increased within the virtual model if the joystick 62 is also moved forward.

In this example operational mode, the view direction and translation directions of the virtual camera within the virtual scene are equivalent and the user changes viewing orientation of the virtual camera by rotating the user device while translation is controlled by displacing joystick 62 as described above.

Moving the virtual camera through the virtual scene according to this example operational mode produces the sensation of 'flying' through the scene. When this mode is selected and entered by the user, the virtual camera is placed at some location (view point) and orientation relative to the virtual scene. The gyroscope sensors 42 detect changes in orientation of the user device and view direction 72 and these changes are used to modify the orientation (and view direction) of the virtual camera relative to the virtual scene. The virtual camera is updated in such a way that the user perceives the mobile device as a window looking into the virtual scene. As the user changes the orientation of the user device, the user device displays the appropriate portion of the virtual scene (e.g., if the device is held in front of the user and rotated to the left in the physical world, the virtual camera rotates to the left in the virtual model).

As the user displaces the joystick 62 forward and changes the orientation of the device 10 to the left (and the view direction 72), the virtual camera translates in an arc to the left within the virtual scene. 'Looking up' with the user device 10 and pressing the virtual joystick 62 forward 'moves' the user toward the ceiling or sky. 'Looking down' and displacing the joystick 62 backward produces the sensation of zooming out on the virtual scene from above. The display screen 32 behaves as though it were a transparent piece of glass through which the virtual scene of the virtual model is viewed in this described embodiment.

In another operational mode, the rotations of the virtual camera are controlled by rotations of the user device 10 as described above, and translations of the virtual camera are controlled to be at a constant elevation within the scene coordinate reference frame. In this example, the azimuth direction 74 of the user device 10 in the global coordinate reference frame controls the azimuth direction of translations of the virtual camera in the virtual scene at a constant elevation. The translation direction 74 may be considered to be a projection of the viewing direction 72 and may be used to define the azimuth direction of translations within a translation plane which is parallel to horizontal within the global coordinate reference frame at the desired constant elevation.

The joystick 62 may be used to control the translations of the virtual camera in the virtual scene including forward and backward translations (responsive to respective forward and backward inputs via the joystick 62) along the view direction of the virtual camera at the constant elevation within the virtual scene in this described embodiment.

As mentioned above for the presently described operational mode, the virtual camera is translated at an elevation of the virtual camera which is fixed relative to the base plane (e.g., floor) of the virtual model. In one embodiment, the virtual camera is positioned at 56" relative to the base plane to resemble the eye level of a human. Accordingly, in this example embodiment, virtual camera translations are intended to maintain the elevation of the virtual camera constant within the virtual scene even if the user device 10 is pointed up or down relative to horizontal while moving.

This embodiment more closely aligns with the experience of walking where the user's view point remains at a constant elevation above the terrain. The elevation of the virtual camera changes only if the elevation of the underlying scene changes in this example implementation. For example, if the user reaches a staircase in a virtual model of a home, the elevation of the virtual camera changes to represent ascending or descending the staircase.

There are a number of ways to provide the virtual camera at the proper elevation within the virtual model. In one embodiment, a movement vector which defines the movement of the virtual camera is calculated using the current view direction 72 of the user device and the vector is projected onto a plane whose normal points in the global Z direction (assuming the global Z coordinate represents elevation in the scene) and is at the desired elevation.

Another method is to translate the virtual camera to the new view point and examine the height of the camera above the terrain in its new position. If the new elevation is not the expected constant value, a second translation in the global Z direction is performed to move the virtual camera to its proper height.

In addition, a look-ahead point (e.g., a point offset some distance from the virtual camera position in the view direction) is maintained and an elevation calculation to position the virtual camera can be performed for the look-ahead point and the virtual camera's change in elevation is interpolated between the elevation at the current location and the look-ahead point in another example. This embodiments may be used to reduce the presence of unnatural jumps in the view point when the elevation changes abruptly (e.g., at a staircase within the virtual model).

Another example method may utilize metadata embedded in the virtual model. This metadata exists at elevation transition points (e.g., at the top and bottom of a staircase) in some embodiments. When the virtual camera reaches an area of the scene containing metadata, the metadata is used to define how the elevation changes to the next transition point.

In addition, the sensors of the user device 10 may be used to determine the elevation of the virtual camera in the scene in another embodiment. For example, data from a range camera of the user device and the gyroscope sensors 42 are combined to find the length and angle of the range camera's direction vector and this vector forms the hypotenuse of a right triangle, with the elevation as one of its legs. The elevation may be calculated using straightforward trigonometry if the length and angle of the hypotenuse are known. In one embodiment, a suitable range camera is configured to provide depth or distance information of individual pixels of images to the lens.

In addition to use of natural rotations of the user device 10 to control the view direction of the virtual camera, translations of the virtual camera within the virtual model may also be controlled using information regarding natural translations of the user device in the physical world in one embodiment. Also, translations of the virtual camera in the virtual scene may be controlled using natural translations of the user device in the physical world in combination with use of the user controls (e.g., joystick 63) to control orientation in some embodiments. Furthermore, in one arrangement, the translation movements of the virtual camera in the virtual scene correspond to translation movements of a user with the user device in the physical world.

In a more specific example, a distance the virtual camera is translated in the virtual scene corresponds to a distance the user device is translated in the physical world. In one example, the scales of the virtual model and the physical world are the same (e.g., a translation of the user device a distance of one foot in the physical world results in a translation of the virtual camera a distance of one foot in the virtual model). In other embodiments, the virtual model and physical world may be scaled differently (e.g., the virtual camera is moved one yard in the virtual model if the user device is moved one foot in the physical world).

For example, the user might physically walk through an open field or gymnasium and see the virtual scene on the screen update as they do so. This mode might be used for a walkthrough of a new house plan or historic structure in more specific examples. The scale may correspond distances within the virtual model to be the same as the physical world or the scale may be changed to allow the user to walk through virtual models of something very small (the human circulatory system) or very large (the Grand Canyon). Regardless of the scale of the scene, correlating physical movements (e.g., rotations and/or translations) with respective virtual movements provides a sense of proportion that is difficult to achieve by moving a joystick or mouse or pressing keyboard buttons.

In some examples described below, the orientation of the virtual camera is controlled by orientation data received from the gyroscope sensors 42 (natural rotation of the user device). In other embodiments, the orientation of the virtual camera is controlled using joystick 63 or other user control for receiving user inputs.

In one embodiment, the sensors of the user device 10 can be used to navigate the virtual scene as the user changes his physical position with the user device 10 (e.g., while the user holds, wears, or otherwise connected with the user device 10). For example, translations of the user device 10 may be monitored and detected via inputs from the sensors that provide information regarding the location of the user device 10 (and user) in space (e.g., location sensors 40, gyroscope sensors 42, accelerometer sensors 44, range camera, etc.).

In particular, data generated and output by the sensors control movements of the virtual camera and are used to update the position of the virtual camera in the virtual scene in this example embodiment. Detected movement of the user device in the physical world a given distance from a first location to a second location with the global coordinate reference frame may control corresponding movement of the virtual camera the same (or scaled) distance of the virtual camera in the scene coordinate reference frame of the virtual scene. The corresponding translated movement of the virtual camera within the virtual scene changes or updates the view point of the virtual camera within the virtual scene.

In some embodiments described below (e.g., the method of FIG. 7 regarding use of natural translation of the user device), a distance the user device moves in the physical world is determined by on board sensors (gyroscope sensors 42 and/or accelerometer sensors 44) without use of any signals which were originally transmitted externally of the user device and received by the user device (e.g., GPS) and without processing of images captured using the camera.

In one illustrative example, gyroscope data from gyroscope sensors 42 and acceleration data from accelerometer sensors 44 are used to detect a user moving with the user device 10, such as stepping. In one embodiment, footsteps of the user holding the user device 10 are detected and used to control translation of the virtual camera. An example method of detecting a step of a user holding the user device 10 and which detection results in translation of the virtual camera within the virtual model is described below with respect to FIG. 7. In some embodiments, the view direction of the user device in the physical world controls the view direction of the virtual camera in the virtual scene. For example, if a wall object of the virtual model is shown using the display screen, the detection of a step results in the change of the view point of the virtual camera in a forward direction toward the wall object which is displayed and the wall object is closer in the updated view in an updated frame following the detection of the footstep. In one embodiment, the elevation of translated movement of the virtual camera in accordance with the view direction of the user device is controlled to be constant. This embodiment provides the user with the impression of looking through a piece of glass at the virtual model as all scene navigation is controlled through physical movement.

Accordingly, as described above in some illustrative embodiments, movements of the virtual camera within the virtual scene correspond to movements of the user device in the physical world, or put another way, the translation and/or rotational movements of the user device in the physical world control corresponding translations and rotations of the virtual camera in the virtual scene.

As discussed above, some operational modes combine aspects of the user's physical environment with the virtual environment and some embodiments enable the initial orientation and view point of the virtual camera within a virtual scene to be specified by the user as navigation of the virtual model is initiated.

In one embodiment, a user input may specify the initial orientation and view point of the virtual camera. For example, the user taps a location in a 2D plan view of the virtual scene to define the view point and drags their finger along the display screen 32 to define the view direction in the virtual scene. The initial 3D view of the virtual scene is drawn with the virtual camera positioned at the tapped location at some default elevation and pointing in the dragged direction in one embodiment. In one example, the user may set the initial view point and initial orientation of the virtual camera looking at the front door, and thereafter, rotations of the user device to the right would result in the front door moving to the left in the virtual scene.

Another method allows the user to enter a 3D view of the virtual scene and use the joysticks 62, 63 to adjust the view point and orientation of the virtual camera to suit. Thereafter, the joysticks 62, 63 may remain or be removed from the view and natural orientation and/or translation via the user device may subsequently control the view point and orientation of the virtual camera following the initial placement.

Another method allows the user to specify a latitude, longitude, and orientation direction for the virtual model. When entering a mode controlled by natural motion (either rotations or translations with the user device), the user device may determine the latitude, longitude, and orientation of the user device in the global coordinate reference frame and compute offsets from the specified values with respect to the scene coordinate reference frame and which may be used to place the virtual camera in its initial location and orientation in the virtual scene.

The discussion continues below with respect to example implementations for controlling rotations and translations of the virtual camera within the virtual scene using natural rotational and translation movements of the user device in the physical world.

In one embodiment of the user device, three gyroscope sensors are configured to monitor rotations about three orthogonal axes with respect to a global coordinate reference frame and three accelerometer sensors monitor accelerations along the three orthogonal axes of the device coordinate reference frame. Data generated by the sensors regarding user device orientation and translation may be utilized to navigate and observe different views of the virtual model as mentioned above.

Accordingly, one or more movements of the user device (e.g., changing the orientation of the user device and/or translating the user device) may be used to interact with and observe different views of the virtual model in one embodiment. In a more specific example mentioned above, changes in orientation and translations of the virtual camera which is used to view the virtual model may be controlled corresponding to changes of orientation and translations of the user device (e.g., the virtual camera is rotated to the left in the scene coordinate reference frame as a result of the user device being rotated to the left in the global coordinate reference frame).

The gyroscope sensors 42 allow the user device to report how it is oriented with respect to a global coordinate reference frame defined by the Earth's gravity and magnetic fields. When an application running on the user device requests the ability to obtain orientation data, the user device begins sampling the gyroscope sensors at regular intervals (60 times per second, for example) in one embodiment. At each sample, the gyroscope sensor provides gyroscope data by notifying a client application being executed by the user device of the current orientation of the user device with respect to the global coordinate reference frame in one implementation. The gyroscope data of these notifications come in the form of 3 Euler angles, a quaternion, or a transformation matrix in some examples. Regardless of its form, the notification contains information about the offset of the three coordinate directions of the present orientation in the device coordinate reference frame from the three coordinate directions of the global coordinate reference frame.

In one embodiment, an initial orientation of the user device is determined in the global coordinate reference frame. Thereafter, the user may change the orientation of the user device, and the user device calculates offset rotations of the user device from the initial orientation of the user device as the user rotates the device, and these offset rotations may be used to update the orientation of the virtual camera within the virtual scene in one example (i.e., rotate the virtual camera a certain number of degrees about an axis of the scene coordinate reference frame the same number of degrees of the offset which the user device rotated about a corresponding axis in the global coordinate reference frame). In one embodiment, the processing circuitry is configured to calculate a plurality of offsets of the view direction of the user device compared with an initial view direction of the user device, and to use the offsets to control the view direction of the virtual camera at the first and second orientations.

Figure 6:
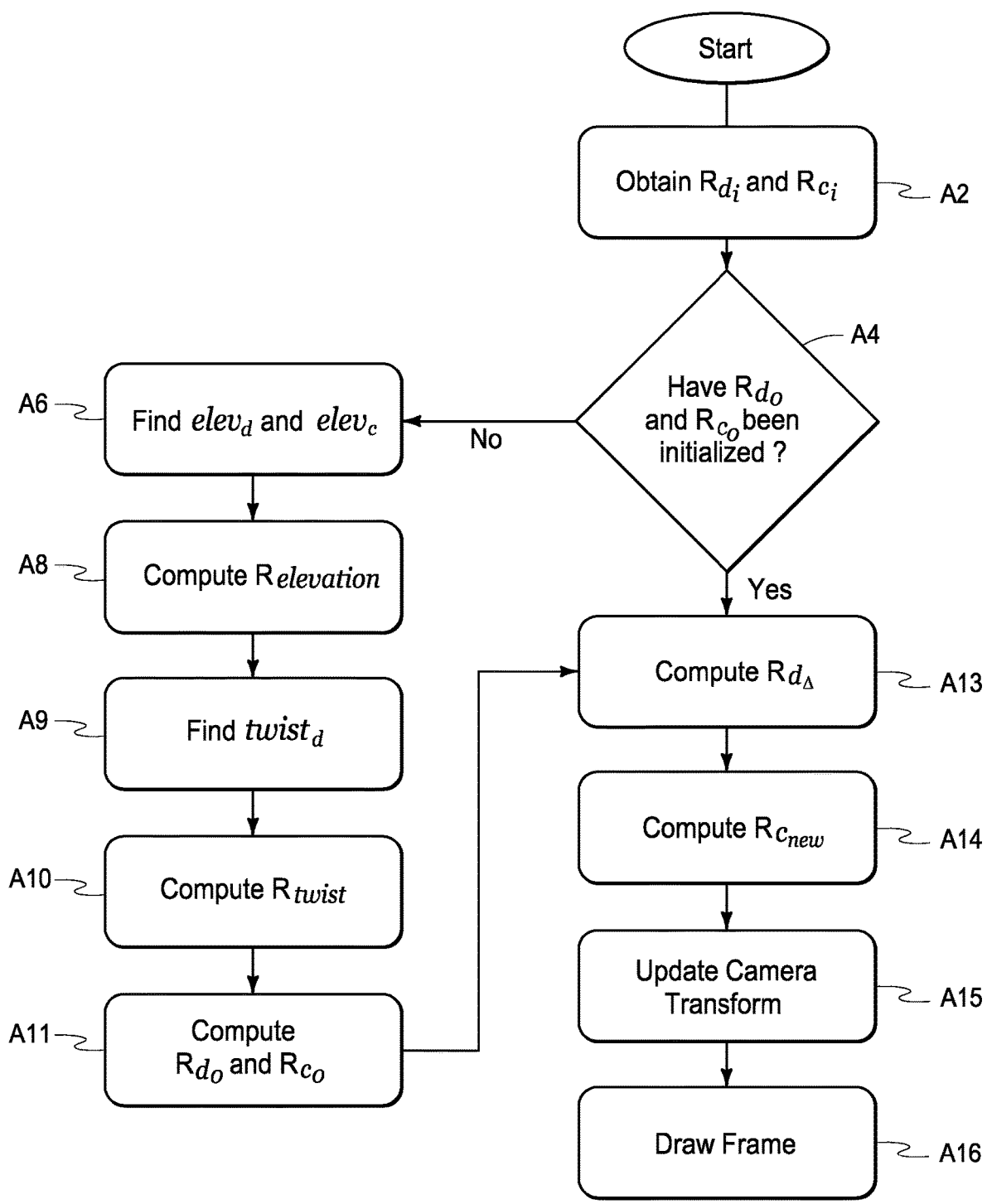
FIG. 6 is a flow chart of a method of updating an orientation of a virtual camera according to one embodiment.

Referring to FIG. 6, a flow chart shows a method according to one embodiment for updating orientation of the virtual camera in the virtual scene based on the processing of gyroscope data generated by the user device. The processing of the gyroscope data may be utilized to change rotations of the virtual camera within the virtual scene as a result of corresponding rotations of the user device in the physical world. The method may be executed by processing circuitry of the user device according to one embodiment. Other methods are possible including more, less and/or alternative acts.

In this described example, the gyroscope data provided by the gyroscope sensors can be used to control an orientation of the transform of the virtual camera object within the virtual scene and which is used to change the view of the virtual model.

In one embodiment described below, the processing circuitry uses a change in orientation of the user device in the global coordinate reference frame to determine an offset within the scene coordinate reference frame and to use the offset to provide the virtual camera at an updated orientation from a previous orientation and which corresponds to the change in orientation of the user device. In one embodiment described below, the offset provides a rotation of the virtual camera in the scene coordinate reference frame which is the same as a rotation of the user device in the global coordinate reference frame (e.g. leftward azimuth rotation of the user device 10 degrees in the physical world provides leftward azimuth rotation of the virtual camera 10 degrees in the virtual world). In one embodiment, the azimuth, elevation and twist of the virtual camera within the virtual scene are controlled in the first and second views using the azimuth, elevation and twist of the user device in the physical world When the user enters an interactive mode that uses the gyroscope sensors to control orientation, the user device's current (instantaneous) orientation with respect to the global coordinate reference frame $R_{di}$, and the camera object's current orientation with respect to the scene coordinate reference frame, $R_{ci}$, are recorded at an act A2. These values are used to compute and cache initial rotations of the user device with respect to the global coordinate reference frame ($R_{d0}$) and initial rotations of the virtual camera object ($R_{c0}$) with respect to the scene coordinate reference frame as described with respect to acts A6-A11.

At an act A4, it is determined whether rotations of the user device ($R_{d0}$) and the camera object ($R_{c0}$) have been initialized (i.e., found).

If the condition of act A4 is affirmative, the process proceeds to an act A13.

If the condition of act A4 is negative, the process proceeds to perform initialization of rotations of the user device ($R_{d0}$) and the camera object ($R_{c0}$) at acts A6-A11.

At an act A6, $elev_d$ and $elev_c$ are determined where $elev_d$ is the angle between the z axis of the global coordinate reference frame (global Z axis) and the view direction of the user device, and $elev_c$ is the angle between the z axis of the scene coordinate reference frame and the view direction of the virtual camera.

At an act A8, the virtual camera's rotation about the x axis of scene coordinate reference frame 19 of FIG. 1 ($R_{elevation}$) can be found using equation 1:

$$R_{elevation} = E(elev_d - elev_c, 0, 0) \quad (1)$$

In equation 1, $E(elev_d - elev_c, 0, 0)$ is a rotation defined by Euler angles. An Euler angle rotation is achieved by specifying rotation angles about the three orthogonal coordinate directions of a reference frame. The three rotations are applied in a specific order to produce a resultant overall rotation. The order in which the rotations are applied is important, since changing the order of these rotations produces a different resultant rotation. Unity implements an Euler angle rotation, $E(\alpha, \beta, \gamma)$, by first rotating the object by $\gamma$ degrees about the Z axis, then by $\alpha$ degrees about the X axis, and finally by β degrees about the Y axis. In Unity, it is possible to specify that the rotations take place about the scene coordinate axes or about the object's local coordinate axes. In either case, the rotations are performed about fixed axes, rather than about axes that may have changed as a result of one or more of the previous Euler component rotations. For example, rotating an object about its local Z axis by γ degrees causes the object's X and Y axes to point in new directions. Unity applies the next rotation, α, about the object's original X axis rather than the new X axis.

At an act A9, the twist angle of the user device (twist$_d$) is found by determining the angle between the global Z axis and a vector pointing out of the right side of the device (i.e., x axis of the device coordinate reference frame 21 of FIG. 1) and subtracting this angle from 90 degrees.

At an act A10, the user device's twist orientation ($R_{twist}$) is computed. $R_{twist}$ can be found using equation 2:

$$R_{twist} = E(0,0,twist_d) \tag{2}$$

At an Act A11, the initial rotations of the user device ($R_{d0}$) and the camera object ($R_{c0}$) are computed and cached. $R_{d0}$ is simply set to $R_{di}$, as in equation 3.

$$R_{d0} = R_{di} \tag{3}$$

Three components of the orientation of the virtual camera are considered to calculate $R_{c0}$ including the virtual camera's azimuth angle $R_{azimuth}$, its elevation angle $R_{elevation}$, and its twist angle $R_{twist}$. For a desirable user experience, the virtual camera object maintains its current azimuth within the virtual scene when a gyroscope-controlled interactive mode is entered in one embodiment.

However, the elevation and twist of the virtual camera are controlled to have the same elevation and twist in the scene coordinate reference frame as the elevation and twist of the user device in the global coordinate reference frame when entering gyroscope-controlled interactive mode in one embodiment. This is accomplished with equation 4 in the described embodiment.

$$R_{c0} = R_{ci} \cdot R_{elevation} \cdot R_{twist} \tag{4}$$

Following the completion of the initialization of acts A6-A11, the method proceeds to an act A13 to perform updates to the virtual camera transform which may change the orientation of the virtual camera resulting from rotations of the user device and are used to draw respective frames including different views of the virtual model at different moments in time, such as a sequential video.

At an act A13, the device offset rotation ($R_{d\Delta}$) is computed from the device's original and current orientations during frame updates by combining the inverse of the initial device rotation $R_{d0}$ with the current device rotation $R_{di}$ in equation 5.

$$R_{d\Delta} = R_{d0}^{-1} \cdot R_{di} \tag{5}$$

At an act A14, a new camera object rotation ($R_{cnew}$) is computed during frame updates by applying the device offset rotation $R_{d\Delta}$ to the initial rotation of the virtual camera $R_{c0}$ in equation 6.

$$R_{cnew} = R_{d\Delta} \cdot R_{c0} \tag{6}$$

The device offset rotation $R_{d\Delta}$ indicates updates or changes to be made to the orientation of the virtual camera in the scene coordinate reference frame corresponding to the changes of the orientation of the user device in the global coordinate reference frame.

At an act A15, the graphics engine sets the orientation of the camera object's transform to $R_{cnew}$ (which changes as the user device orientation changes) during each frame update and which results in changes in orientation of the view direction of the virtual camera within the virtual scene and corresponding to changes of the orientation of the user device in the physical world.

Updating the camera object in this way produces the sensation of looking through the device into the virtual scene. As the user rotates the user device, the view direction of the virtual camera updates allowing the user to easily explore the scene. The rotation of the device to the left will result in the virtual scene moving to the left (e.g., for a virtual scene within a room, rotation of the user device to the left may show a wall of the room to the left which was not shown in the previous views of the virtual scene).

At an act A16, the frames of the virtual scene are drawn using the user device.

The gyroscope data from the gyroscope sensors 42 may also be used to transform accelerometer data from the device coordinate reference frame to a global coordinate reference frame in one embodiment. Accelerometer data can be obtained from the accelerometer sensors 44 of the user device at the same time that orientation notifications occur which include the gyroscope data from the gyroscope sensors 42 in one embodiment.

The accelerometer data is provided in device coordinates and the user device registers accelerations along the three axes of the user device regardless of how the device is oriented in space. However, it may be more useful for some applications to utilize acceleration information with respect to the global coordinate reference frame of the physical world. In one embodiment, a transformation matrix is provided within an orientation update sample from the gyroscope sensors and which can be used for this purpose.

Mathematically, acceleration a may be represented as a 3-dimensional vector with one element for each of the coordinate axes of the respective reference frame per equation 7.

$$a = \begin{pmatrix} a_x \\ a_y \\ a_z \end{pmatrix} \tag{7}$$

Global acceleration with the global coordinate reference frame, $a_{Global}$, can be calculated from the acceleration of the user device in the device coordinate reference frame, $a_{Device}$, and the device-to-global transformation matrix $T_{DeviceToGlobal}$ using equation 8.

$$a_{Global} = T_{DeviceToGlobal} \cdot a_{Device} \tag{8}$$

During updates, the accelerometer sensors of the user device generate $a_{Device}$ and the gyroscope sensors generate the global-to-device transformation matrix, $T_{GlobalToDevice}$. The device-to-global transformation matrix $T_{DeviceToGlobal}$ can be obtained from the inverse of the global-to-device transformation matrix $T_{GlobalToDevice}$ using equation 9.

$$T_{DeviceToGlobal} = T_{GlobalToDevice}^{-1} \tag{9}$$

In general, computing the inverse of a matrix is problematic since this operation can be computationally intensive and because the matrix might be singular. However, in this described embodiment, the matrix is a pure rotation matrix since it only contains input from the device's gyroscope sensors and a pure rotation matrix is not singular, and its inverse is its transpose. Accordingly, the device-to-global transformation matrix $T_{DeviceToGlobal}$ may be calculated (transposed) using equation 10 in one example.

$$T_{GlobalToDevice}^{-1} = T_{GlobalToDevice}^{T} \tag{10}$$

Thus, the global acceleration $a_{Global}$ can be obtained by Equation 11.

$$a_{Global} = T_{GlobalToDevice}^T \cdot a_{Device} \quad (11)$$

This example method is efficient since computing the transpose of a matrix is less computationally intensive than computing its inverse and the computation is performed for the samples being generated many times per second (e.g., 60 Hz) in one embodiment.

As discussed above, orientation of the user device in the physical world may be used to control the orientation of the virtual camera with respect to the virtual model in one embodiment. In addition, location and movement of the user device in the physical world may also be used to control the location and movement of the virtual device with respect to the virtual model in one embodiment.

In one embodiment, one or more location sensor of the user device may provide location data which may be utilized to determine a device's location and velocity in space. The processing circuitry combines data from the location sensors (e.g., GPS and/or data network signals) to produce an estimate of the device's location in one embodiment. Readings from location sensors are desirable because they are given as absolute coordinates in the global coordinate reference frame rather than as offsets from previous readings. Use of location sensors is self-correcting because slight errors in the sensor readings for one sample do not affect subsequent samples. The location data obtained by the location sensor may be used to control translation of the virtual camera within the virtual model according to one embodiment.

In example embodiments, the virtual model is at least partially or completely aligned with the physical world. If completely aligned, a relative offset between the scene and global coordinate reference scenes is reduced or eliminated such that locations in the virtual model may be mapped to corresponding locations within the physical world and the virtual camera is provided at a location within the virtual model which corresponds to a location of the user device in the physical world. In addition, the virtual camera may be moved within the virtual model corresponding to movements of the user device in the physical world as detected by the location sensors. Accordingly, location data from the location sensors may be used to control the location and movements or translations of the virtual camera within the virtual model in an example embodiment. In one embodiment, the location of the user device may be determined at individual frame updates and detected movement of the user device may be used to move the virtual camera to a new view point (as well as make adjustments to the orientation of the virtual camera corresponding to changes in orientation of the user device between frames).

In some embodiments, coordinates of the virtual scene may be aligned with physical coordinates of the physical world as mentioned above. For example, an xy base plane of the virtual scene is the same as the xy plane of the physical world on the ground in some embodiments (e.g., the floor of an architectural structure virtual model is on the ground). In some embodiments, the virtual scene and physical world may be completely aligned (i.e., a North direction in the virtual model is aligned with North in the physical world). In one example embodiment, a user may hold the device facing a given direction in the real world and use joystick 63 to rotate the virtual scene until the desired portion of the virtual model is displayed in the view to align the virtual and global coordinate reference frames. The orientation of the virtual camera is the same as the orientation in the physical world in this example.

As discussed in some example embodiments herein, the scene coordinate reference frame may be partially or completely aligned with the global coordinate reference frame. Furthermore, as discussed above, the user device and virtual camera are initially coupled with one another by storing initial orientations or rotations of the user device and virtual camera, and thereafter offsets are generated resulting from movements of the user device during navigation and which are applied to the rotation of the virtual camera to synchronize movements of the user device and the virtual camera with one another in the global and scene coordinate reference frames which may be partially or completely aligned with one another. Using the above described example method in some embodiments, the orientations of the virtual camera within the scene coordinate reference frame correspond to or are the same as the respective orientations of the user device in the global coordinate reference frame.

At any time, the user can adjust the alignment of the scene and global coordinate reference frames to change their relative offset with respect to one another (e.g., using a joystick to rotate and change the azimuth of the virtual model with respect to the physical world). Thereafter, an offset rotation of the user device from an initial orientation is determined as a result of changes in orientation of the user device for each frame update, and the same offset rotation is applied to change the orientation of the virtual camera with respect to its initial orientation. As discussed herein, the orientation of the user device may be monitored using the view direction of the user device and the orientation of the virtual camera may be controlled with respect to the view direction of the virtual camera in one embodiment.

Accordingly, in one embodiment, a user may orient or align the virtual scene to the physical environment using traditional controls (e.g. joysticks, gestures, mouse movement, keyboard buttons, etc.) and an example navigation method described herein maintains synchronization between the physical world and the virtual scene as the user uses natural movement to navigate the scene.

Another example for controlling location of movement of the virtual camera is to use samples from the accelerometer and/or gyroscope sensors of the user device to calculate changes in the position of the user device (without the use of any signals originally transmitted externally of the user device and received by the user device in some embodiments).

In one example, the change in position or velocity of the user device in 3-dimensional global space, v, is related to its acceleration, a, by equation 12.

$$v = \int a \, dt. \quad (12)$$

The device's position, p, is related to its velocity by equation 13.

$$p = \int v \, dt. \quad (13)$$

Equations 12 and 13 can be used to modify the velocity and position of the virtual camera based on updates from the device's accelerometer sensors. However, updates of accelerometer data are received as discrete samples, so discrete alternatives to these equations are used in one embodiment. The velocity and position at sample k can be found by equations 14 and 15 where ti is the timestamp of sample i.

$$v_k = \Sigma_{i=1}^{k}(t_i - t_{i-1})a_i \quad (14)$$

$$p_k = \Sigma_{i=1}^{k}(t_i - t_{i-1})v_i \quad (15)$$

Equations 14 and 15 are discrete approximations of continuous functions and numerical discretization error can be reduced by using the trapezoidal rule or other forms of quadrature. Doing this produces equations 16 and 17.

$$v_k = \sum_{i=1}^{k} (t_i - t_{i-1}) \frac{(a_{i-1} + a_i)}{2} \qquad (16)$$

$$p_k = \sum_{i=1}^{k} (t_i - t_{i-1}) \frac{(v_{i-1} + v_i)}{2} \qquad (17)$$

Equations 16 and 17 help reduce error due to discretization in the described embodiment.

Furthermore, the method may also force the velocity to zero if the absolute value of the acceleration is below a threshold value for some period of time to assist with reduction of roundoff errors and errors resulting from the accelerometer sensors.

Other methods of controlling translation of the virtual camera within the virtual model detect when the user takes a footstep with the user device and uses the detected footstep to update the view point of the virtual camera in response to the detection. In one embodiment, data from the accelerometer and gyroscope sensors of the user device are monitored to detect the presence of a footstep.

In one embodiment, detection of a footstep is used to control the virtual camera to move in a translation direction defined by the orientation of the user device in the physical world at a particular speed and a constant elevation within the virtual model. In one embodiment, footsteps are detected by analyzing the periodic nature of the output of the accelerometer sensors which are generated as a result of a user stepping with the user device (e.g., holding the device in front, wearing the device, etc.).

One implementation of this method uses two independent loops which are executed by the processing circuitry: an accelerometer sensor sampling loop and a frame update loop which operate at different frequencies. For example, a sampling rate (e.g., 60 Hz) is selected and used to sample the accelerometer data which is generated by the accelerometer sensors in order to adequately process the output of the accelerometer sensors. The update loop is set to a variable refresh rate which is less than the sampling rate of the accelerometer sensors (e.g., within a range of 20-40 Hz) since increased computation is performed during the frame update loop and the human eye can perceive motion at a refresh rate significantly lower than 60 Hz.

Figure 7:
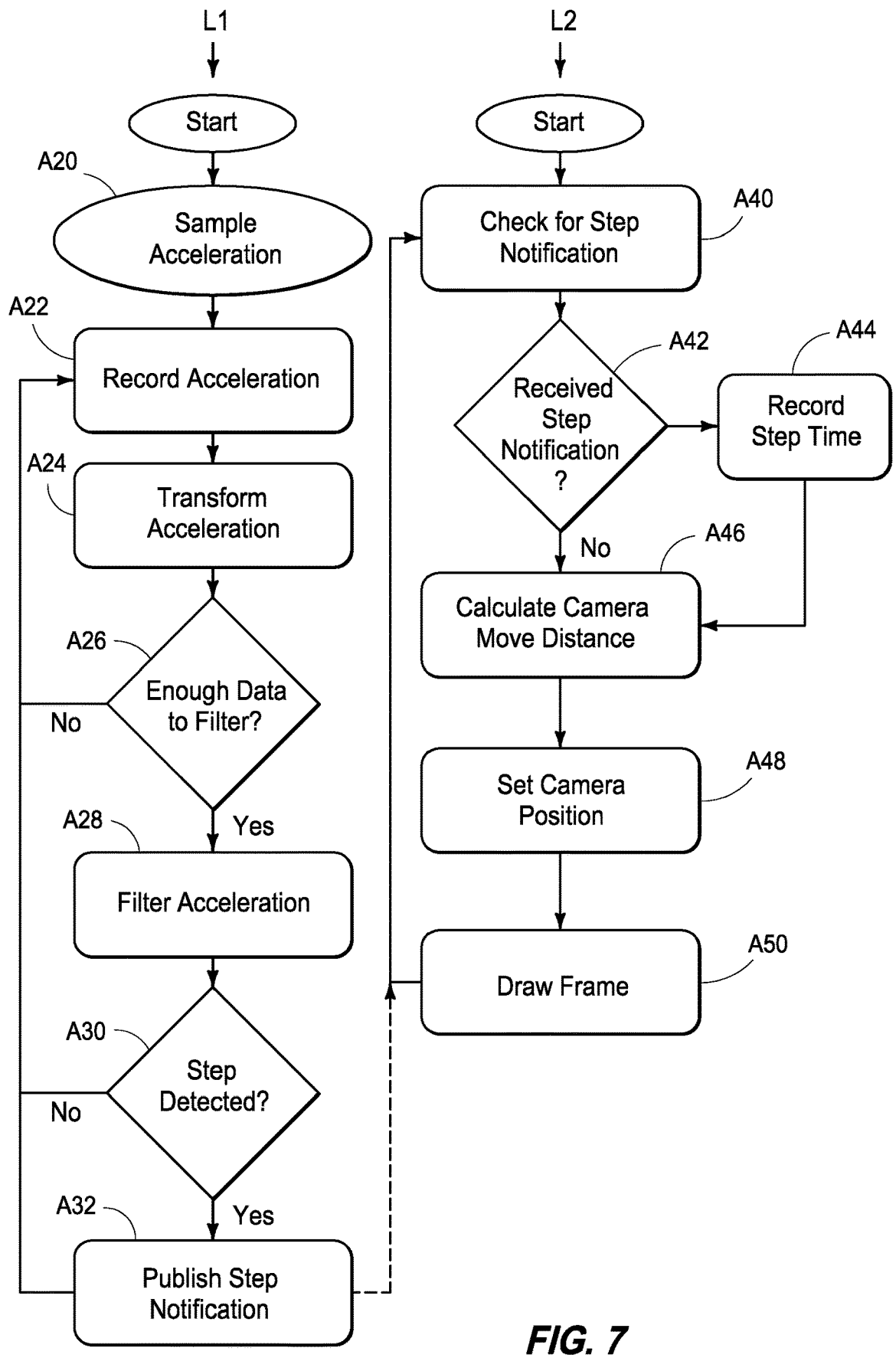
FIG. 7 is a flow chart of a method of detecting a footstep and updating location of a virtual camera according to one embodiment.

Referring to FIG. 7, an example method of detecting the occurrence of footsteps of a user holding user device and which may be executed by processing circuitry of the user device is shown according to one embodiment. Other methods are possible including more, less and/or alternative acts.

The illustrated example method includes a plurality of independent loops including the accelerometer sensor sampling loop L1 and a frame update loop L2 which may be executed in parallel.

Initially, the user device is notified at an act A20, that the accelerometer sensors should be sampled to generate accelerometer data.

At an act A22, the samples of the acceleration data are obtained and stored in storage circuitry.

At an act A24, for each accelerometer sample, the acceleration data is transformed from device coordinates to global coordinates as discussed herein. In one embodiment, only accelerometer data in the global Z direction is used subsequently below for step detection and the accelerometer data in the global X and Y directions is not used.

At an act A26, it is determined whether a sufficient number of samples of the accelerometer data have been obtained to allow filtering (e.g., sixteen samples).

If not, the loop L1 returns to act A22 to record additional samples of the acceleration data.

If so, the loop L1 proceeds to an act A28 to perform filtering of the samples of the acceleration data to remove noise and other unwanted frequencies.

Unfortunately, raw accelerometer data obtained from the accelerometer sensors is not well-suited for step detection since the data may be noisy even when the device is at rest, and further the signal produced by natural stepping motion is periodic but also contains minor peaks and valleys that make step detection difficult. Accordingly, one processing method filters the output of the accelerometer sensors to remove undesired frequency elements.

In one embodiment described below, filtering of the accelerometer data is provided about an assumed typical stepping frequency at which people typically walk (e.g., 1.667 Hz with an associated period of approximately 0.6 seconds) in one embodiment. As described below in one embodiment, a two-step filtering process is used which removes all components except those within a desired frequency range of approximately 1 Hz-4 Hz about the typical stepping frequency and which corresponds to a typical stepping frequency range of a user. Data within the typical stepping frequency range is used to detect a footstep of an individual in the illustrated example. The discussion proceeds with respect to an embodiment where low pass filtering is first performed, and thereafter, individual cycles of the accelerometer data are filtered to determine whether any of the individual cycles correspond to a step of a user.

In one example, digital signal processing (DSP) techniques can be employed to create a filter that removes unwanted frequencies above the typical stepping frequency range. For example, one implementation employs a low-pass filter to remove frequencies above the typical stepping frequency range. In one embodiment, the low-pass filter has a cutoff frequency of 4 Hz to remove the higher frequency components.

In one more specific example, a digital Finite Impulse Response (FIR) filter is utilized to perform the low-pass filtering and may employ a 16-element coefficient vector which produces a 16 sample shift in the phase of the filtered signal.

At an example accelerometer sensor sample rate of 60 Hz, this phase shift means that the filtered signal lags the raw signal by 16/60=0.267 seconds. With an FIR filter, a larger number of filter coefficients usually results in improved filter characteristics. However, a larger number of filter coefficients produces a longer time lag in the signal unless the sample frequency is also increased. A longer time lag is undesirable because the user begins to notice that steps registered by the method are out of phase with the actual steps. The user experience would be negative if, for example, the user had to wait seconds after taking a step to see the scene of the virtual model update. Increasing the sample rate reduces the lag within the filtered signal, but leaves less time for calculations to be performed between samples. In one embodiment, a 16-element coefficient vector filter coupled with a 60 Hz refresh rate represents a reasonable compromise between accuracy in computation and reaction time of the method based upon current hardware available in typical user devices.

In addition, other filters may be used in other embodiments. In the above example, a FIR filter was chosen over an Infinite Impulse Response (IIR) filter because a signal passed through a digital IIR filter may continue to show oscillations long after the raw signal has stopped oscillating. In step detection, it is desirable to detect a single step and ensure that additional 'false' steps aren't created by the filter. An FIR filter is more computationally intensive than an IIR filter but does not suffer from the 'ringing' limitation. Accordingly, the processing described according to one embodiment accurately detects the presence of one footstep of a user.

Figure 8:
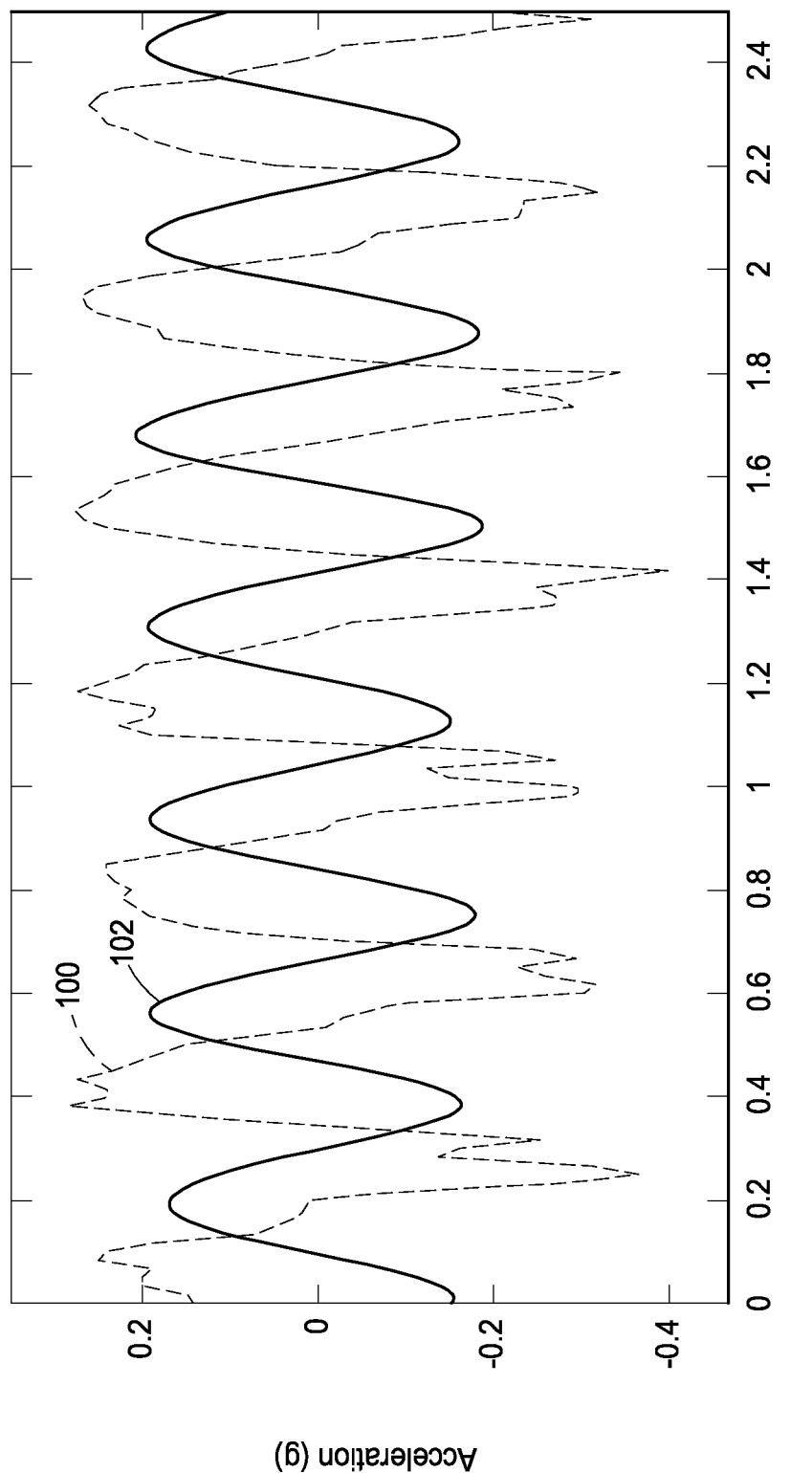
FIG. 8 is a graphical representation of raw and filtered acceleration data obtained by a user device according to one embodiment.

Referring to FIG. 8, a graphical representation of a raw acceleration data signal 100 in the global Z axis direction is shown as captured from the output of the acceleration sensors and transformed to the global reference as described herein. The illustrated filtered output signal 102 results from the example filtering using the FIR filter described above.

At an act A30, the signal resulting from the filtering is examined to determine whether a step has occurred. The raw acceleration data signal is analyzed to determine if the user is stepping after the filtering of the data in the described implementation.

In one embodiment described below, the processing of act A30 analyzes individual cycles to determine whether any of the individual cycles corresponds to a footstep of a user stepping with the user device.

Figure 9:
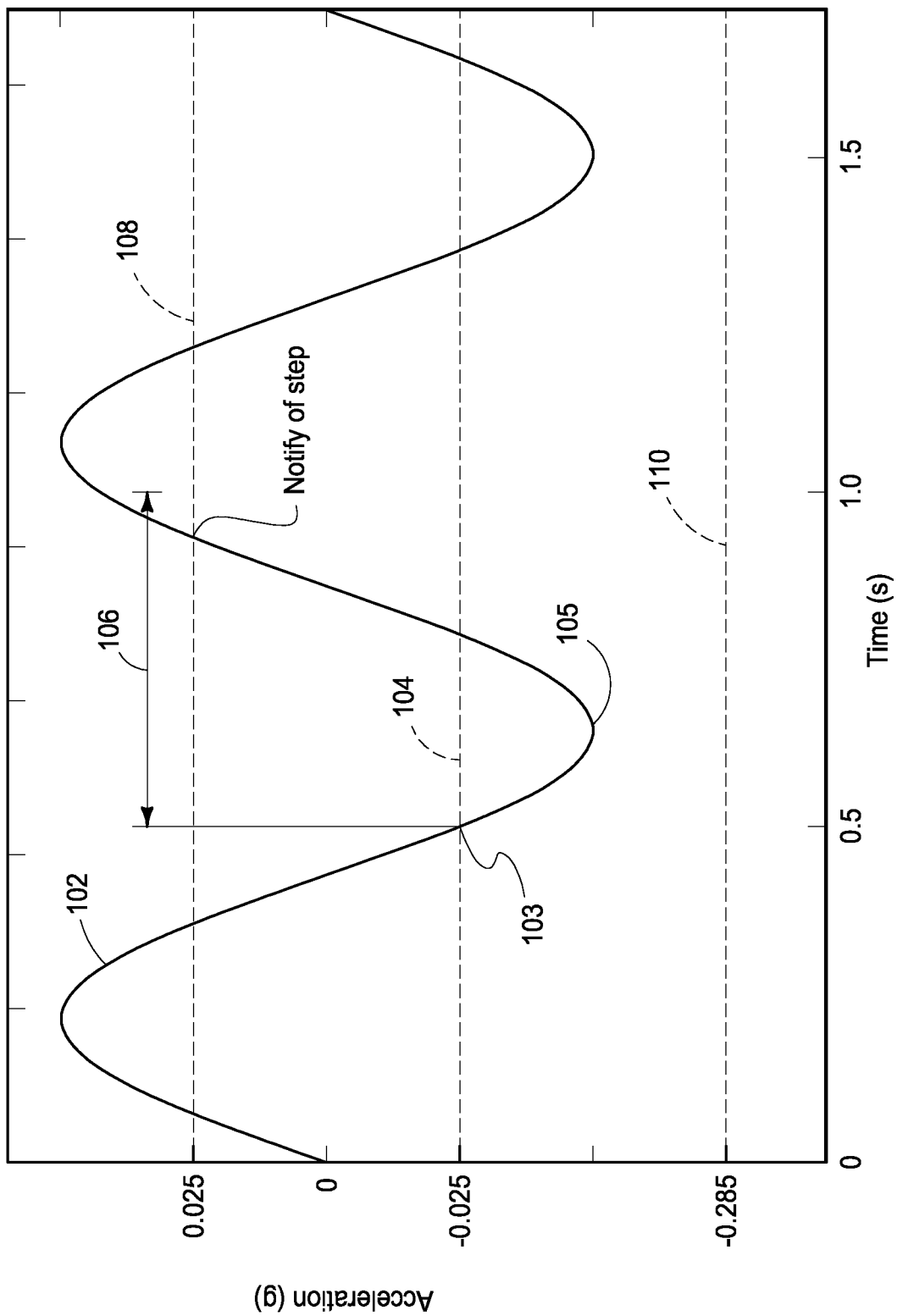
FIG. 9 is a graphical representation of filtered acceleration data obtained by a user device according to one embodiment.

Referring to FIG. 9, one method of detecting whether a step has occurred using the filtered output signal 102 is described in one embodiment. The method of FIG. 9 performs additional filtering of the output signal and effectively functions as a high-pass filter such that the filtered output signal 102 comprises only components above approximately 1 Hz in one embodiment. This additional filtering of act A30 in combination with the filtering of the raw data signal described above of act A28 performs a two-step band pass filtering process which removes all components except those within the typical stepping frequency range of approximately 1 Hz-4 Hz.

In one embodiment, a period of an individual cycle of the accelerometer data is analyzed with respect to a period of a typical footstep cycle (0.6 seconds), and a cycle is identified as corresponding to a footstep of a user with the user device if the period of the cycle of data is less than the period of a typical footstep cycle. Cycles of accelerometer data having periods greater than the period of the typical footstep cycle are filtered and not indicated as corresponding to a footstep of the user with the user device. As described below, less than an entirety of the individual cycle of accelerometer data may be analyzed to determine whether it corresponds to a footstep by selection of a cutoff period of time ($t_{cutoff}$) 106.

The described example method makes use of a negative minimum acceleration threshold ($-a_{thresholdmin}$) 104, a positive minimum acceleration threshold ($+a_{thresholdmin}$) 108, and a cutoff period of time ($t_{cutoff}$) 106 to determine whether a step has occurred. The cutoff period of time 106 is set to be longer than half the period of a typical footstep cycle of a user and less than the period of the typical footstep cycle of the user. For example, the cutoff period of time 106 is 0.5 seconds in one embodiment. Use of different cutoff periods of time 106 will adjust the frequencies which are passed by the high-pass filtering in the described example.

Each (filtered) acceleration sample in the global Z direction of signal 102 is examined to determine whether the signal has 'crossed' $+/-a_{thresholdmin}$ 104, 108. If $-a_{thresholdmin}$ 104 has been crossed and the signal 102 is decreasing, the moment in time at which the crossing occurred is recorded as $t_{lower}$ 103. Subsequent samples are examined to determine whether $+a_{thresholdmin}$ 108 has been crossed while the signal 102 is increasing. A step is detected if signal 102 crosses $-a_{thresholdmin}$ 104 while decreasing and crosses $+a_{thresholdmin}$ 108 while increasing within $t_{cutoff}$ 106 seconds to be registered in the described example.

The above describes analysis of one possible portion of a cycle of the data with respect to the cutoff period of time 106. There are other crossings of thresholds 104, 108 which may be analyzed in other embodiments. If the crossings of thresholds 104, 108 by signal 102 are numbered 1-8 from left to right, portions of the signal 102 between the first and third crossings, between the second and fourth crossings, or between the fourth and sixth crossings may be analyzed with respect to the cutoff period of time 106 to determine whether an individual cycle corresponds to a footstep (i.e., in addition to the portion of the signal 102 which corresponds to the third and fifth crossings described above with respect to crossing 103 and the cutoff period of time 106 shown in FIG. 9).

Accordingly, in one embodiment, only a portion of an individual cycle of accelerometer data is compared with a predefined length of time corresponding to the cutoff period of time 106 to determine whether the individual cycle corresponds to a footstep.

The example of FIG. 9 is described with respect to analysis of the signal 102 while increasing with respect to $+a_{thresholdmin}$ 108 to detect the presence of a footstep. In another embodiment, the signal 102 may be analyzed in the same manner while decreasing with respect to $-a_{thresholdmin}$ 104 to detect the presence of a footstep within the cutoff period of time. In this example, the cutoff period of time may be initiated when the signal 102 crosses $+a_{thresholdmin}$ 108.

The second step of filtering of act A30 filters cycles having frequencies less than the typical stepping frequency range (e.g., below 1 Hz) in one implementation. This filtering of FIG. 9 helps to ensure that lower frequency accelerometer oscillations due to device rotation are not mistaken for footsteps. More specifically, the above-described example detection operates as a high-pass filter upon the low pass filtered output of the FIR filter in the example two-step filtering process and footsteps are detected if the accelerometer data includes frequencies within the typical stepping frequency range (e.g., 1-4 Hz) in one embodiment. A notification that a step has been detected may be generated to indicate the presence of the footstep of the user stepping with the user device as a result of the detection of such frequencies.

The two-step process of first applying a digital low-pass filter to the signal and then applying the time cutoff technique mentioned above according to one embodiment operates as a band-pass filter. The digital low pass filter removes frequencies above a certain range (e.g., 4 Hz), and then the time cutoff technique through use of the cutoff period of time removes frequencies below a certain cutoff frequency (e.g., 1 Hz).

This two-step filtering arrangement allows for a very narrow band of frequencies to be filtered while maintaining computational efficiency compared with a traditional digital band pass filter which focuses in on a narrow frequency band and which uses a higher sample rate and/or a larger coefficient vector. However, increasing the sample rate decreases the amount of time available to make computations between samples and increasing the size of the coefficient vector increases the number of computations that must be performed for each sample. The two-step filtering process according to one embodiment of the disclosure is efficient which enables use in real-time as a user is stepping.

The two-step filtering process allows the lower cutoff frequency to have an infinitely small transition zone. In particular, signals below the cutoff frequency are completely attenuated and signals above the cutoff frequency are not attenuated at all in the described example arrangement which results in a faster filter of increased purity compared with some traditional digital filter design techniques which provide relatively wide transition zones with signal distortion introduced at and around the cutoff frequencies.

The use of the cutoff period of time for the lower frequency cutoff results in the low frequency cutoff being extremely sharp and very accurate which is applicable to narrow range band pass filtering. Additionally, this example technique yields an output signal where the lower end of the pass band signal suffers less from ripples or ringing that are often associated with traditional digital filtering techniques.

Not all oscillations that fit within the time window described above are registered as footsteps in one embodiment. Stepping is characterized by relatively small accelerations associated with small displacements of the user device. If large accelerations are detected, experience has shown that these accelerations are usually associated with large displacements of the user device and usually aren't due to foot steps being taken. Instead, these large accelerations typically occur when the user is moving the user device to look down at the floor or up at the ceiling of the virtual model.

In one embodiment, a maximum acceleration threshold ($a_{thresholdmax}$) 110 is used to ensure that accelerations with a relatively large magnitude are not registered as footsteps. This threshold $a_{thresholdmax}$ 110 was empirically derived as −0.285 g in one implementation (threshold 110 is not drawn to scale in FIG. 9). Furthermore, an amplitude ($a_{amplitude}$) 105 of each cycle is found by recording the minimum acceleration since the signal last crossed 0.0 g while decreasing and prior to increasing. When a footstep is detected as above, $a_{amplitude}$ is compared with $a_{thresholdmax}$ and a footstep is registered as being detected only if the absolute value of $a_{amplitude}$ is less than the absolute value of $a_{thresholdmax}$ in this embodiment. Otherwise the detection is disregarded as being a relatively large amplitude not due to a footstep.

Accordingly, in one embodiment, the detected presence of a footstep is not indicated as being a detected footstep if the accelerometer data has an amplitude which is larger than a threshold amplitude ($a_{thresholdmax}$) which is indicative of a typical footstep. In one embodiment, an amplitude of a cycle of the accelerometer data is determined and compared with a maximum acceleration threshold, and the detected footstep is only indicated as being detected if the amplitude of the accelerometer data is less than the maximum acceleration threshold.

A user with a very light step produces acceleration data in the global Z direction which has a smaller amplitude compared with a user with a heavy step. Likewise, a user stepping on cement will produce different acceleration data than the same user stepping on grass. One embodiment of the footstep detection method adapts to these differences and detects steps under a wide variety of conditions.

In one implementation, the threshold acceleration, $a_{thresholdmin}$ is adjusted and adapted to the acceleration data being generated based on the amplitude of the filtered signal. In particular, the threshold acceleration $a_{thresholdmin}$ is set according to equation 18:

$$a_{thresholdmin} = \min(a_{minimum}, C \cdot a_{amplitude}) \quad (18)$$

where $a_{minimum}$ is a predetermined minimum acceleration value, $a_{amplitude}$ is the amplitude of the accelerometer data of the most recent cycle and corresponding to the footstep of a user, and C is a scalar that sets $a_{thresholdmin}$ to some percentage of $a_{amplitude}$. The values of $a_{minimum}$ and C may be empirically derived and hardcoded or set by the user and examples of these values are $a_{minimum}$=0.025 g and C=0.25 in one implementation. The value of $a_{amplitude}$ is larger for a user with heavy steps as detected by the accelerometer sensors of the user device compared with a user with light steps. Adapting $a_{thresholdmin}$ in this way allows the algorithm to adjust to changing conditions (i.e., how the user steps and upon different surfaces).

Referring again to FIG. 7, acts A28 and A30 operate as a two-step filtering process of the accelerometer data in one embodiment.

If the processing of the acceleration data does not result in a step being detected at act A30, the process returns to act A22.

However, if the processing of the acceleration data results in a step being detected at act A30, the process proceeds to an act A32 to publish a step notification which indicates that a footstep has been detected.

The discussion below proceeds to virtual model navigation. However, the above-described example two-step filtering process may also be applied or utilized in other applications for other filtering purposes in other embodiments. In particular, the two-step process of filtering to create a band-pass filter may be useful in domains outside of step detection and device motion. The two-step filter may be used in situations where it is useful to filter all but a narrow band of frequencies, where the speed of computing and analyzing the filtered data is important (e.g. processing a signal in real time), when it is desirable to clearly distinguish between included and excluded frequencies that are close to the lower frequency cutoff, and/or when it is desirable to remove 'ringing' in the filtered low frequencies. Some more specific illustrative additional applications include sonar and radar processing, seismic data processing, audio and speech processing, image processing, etc.

As mentioned above, the frame update loop L2 may be executed in parallel with the loop L1. At an act A40 of loop L2, the process attempts to access a published step notification indicating that a user footstep has been detected.

At an act A42, it is determined whether a step notification indicating the detection of a footstep has been published by loop L1.

If a step notification has been published, the method proceeds to an act A44 to record the time of the detection of the footstep.

Thereafter, or if the condition of act A42 is negative, the method proceeds to an act A46 to calculate a camera move distance which may be used to reposition the virtual camera at a new view point within the virtual scene as a result of a step being detected.

In particular, with step notifications being sent to the frame update loop L2 from loop L1, it is possible to calculate the distance the virtual camera should move for each frame update of the virtual scene. In one embodiment, this distance d is calculated by Equation 19:

$$d = t_{update} \cdot f_{step} \cdot l_{step} \cdot A \quad (19)$$

where $t_{update}$ is the time since the last frame update, $f_{step}$ is the user's step frequency, $l_{step}$ is the length of the user's step, and A is an attenuation function.

To calculate $t_{update}$, a timestamp is recorded at each frame and the timestamp for the last frame is subtracted from the timestamp for the current frame. The step frequency $f_{step}$ is assumed to be a constant or may alternatively be calculated using accelerometer data in example embodiments. As mentioned above, an assumed step frequency $f_{step}$ at which people typically walk is 1.667 Hz (having a period of approximately 0.6 seconds) in one embodiment.

The step length, $l_{step}$, is set to a reasonable default value (e.g., 30 inches) and is modifiable by the user. In another example, $l_{step}$ can be obtained by instructing the user to walk a measured distance holding the user device while the algorithm picks up steps and dividing the distance covered by the number of steps provides the step length $l_{step}$. With location sensors capable of measuring position or distance traveled with high accuracy, $l_{step}$ is calculated and adjusted at run time using the location sensors in one embodiment.

In one embodiment, the attenuation function A can be computed according to Equation 20:

$$A = \max\left(0, 1 - \frac{t_{current} - t_{step}}{t_{live}}\right) \quad (20)$$

where $t_{current}$ is t the timestamp of the current frame, $t_{step}$ is the timestamp of the last frame for which a step was recorded, and $t_{live}$ t is the 'time to live' for a step. In one example, $t_{live}$ t is a constant of 0.7 seconds. Thus, the attenuation A is 1.0 for the frame when a step is first recorded, and linearly decreases to 0.0 for each frame drawn after the step. The use of the attenuation function A in the described example ensures that the virtual camera moves while the user is stepping and that the virtual camera stops moving if a step has not occurred after a time of $t_{live}$.

Accordingly, in some embodiments, the method detects a small number of steps (even a single step) and responds to it in real time or in a manner that feels like real time to the user. In particular, the virtual camera is moved within the virtual scene following the detection of a single footstep by a user. Use of equation 20 provides a good compromise where the virtual camera moves instantly when a single step is detected and it causes the virtual camera's velocity to taper linearly (not asymptotically) toward 0 as time elapses without another step. In one embodiment, translation movement of the virtual camera is initiated responsive to the detection of an initial single footstep after the user device has been stationary (i.e., without any detected footsteps) and prior to detection or indication of another/subsequent footstep. Equation 20 also produces a virtual camera velocity in the virtual scene that is proportional to the step frequency $f_{step}$ since the average attenuation will be higher for higher step frequencies.

Figure 10:
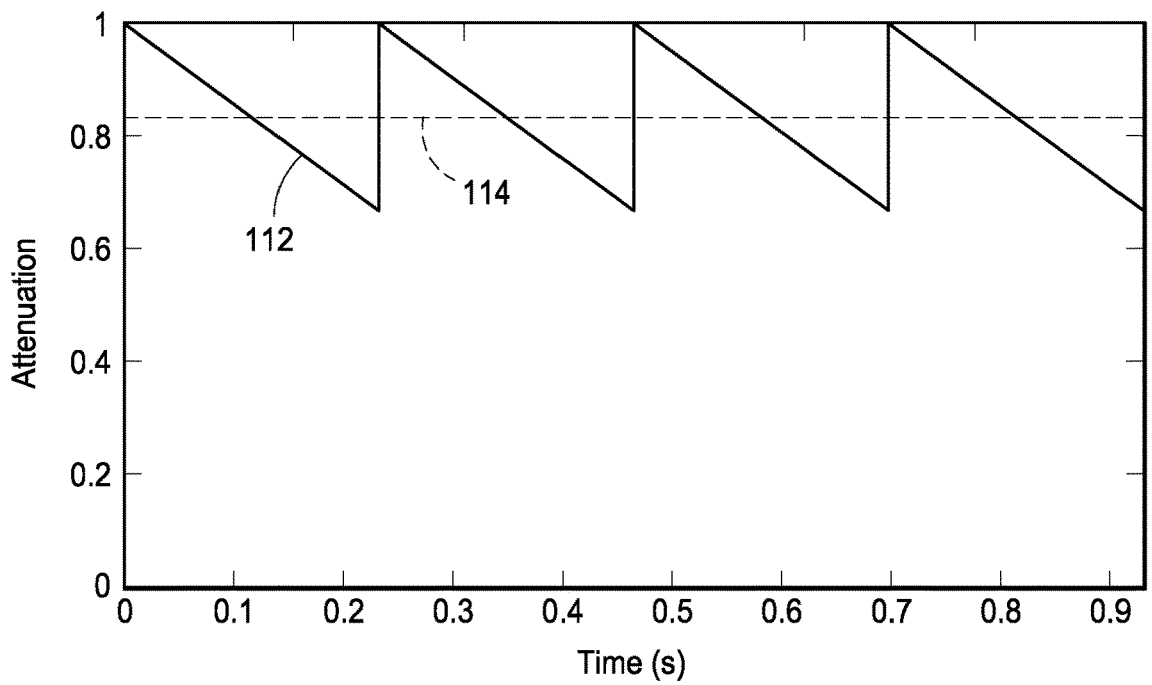
FIGS. 10 and 11 are graphical representation of different attenuation functions according to one embodiment.

Referring to FIG. 10, an attenuation function 112 is shown when steps occur every 0.3 seconds and $t_{cutoff}$ is 0.9 seconds. An average 114 of attenuation function 112 is also depicted.

Figure 11:
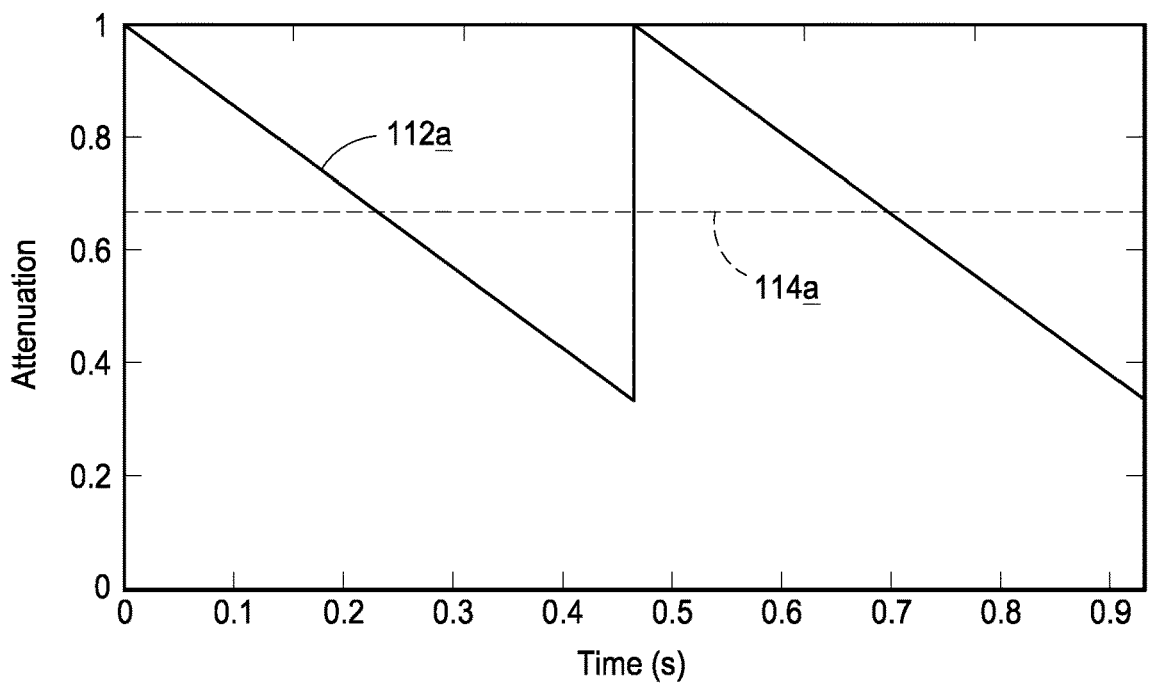

Referring to FIG. 11, an attenuation function 112a is shown when steps occur every 0.6 seconds and $t_{cutoff}$ is 0.9 seconds. An average 114a of attenuation function 112a is also depicted.

As shown in FIGS. 10-11, the use of equation 20 produces higher average attenuations for higher step frequencies which results in larger distances being determined in equation 19 providing larger displacements of the virtual camera (and increased velocity of the virtual camera) compared with lower step frequencies.

Accordingly, in one embodiment, frame updates occur in a separate loop L2 from the accelerometer sensor sampling loop L1, and each time through loop L2, the method checks to see if a step notification has been sent from the accelerometer sampling loop L1.

If a step notification is received, the timestamp for the frame on which the notification was received is recorded as $t_{step}$. Then, the distance to move the virtual camera is computed for all frames in the described example, regardless of whether a step notification is received. The camera move distance could be (and often is) zero since the camera move distance is a function of the time since the last recorded step. This quantity decreases linearly from the time a step is recorded until the camera move distance reaches 0.

Following the calculation of the camera move distance, the method proceeds to an act A48 to set the position of the virtual camera at an updated view point within the virtual model based on the computations of act A46. In one embodiment, the distance between the first and second view points is defined by equation 19.

In one embodiment, the virtual camera is moved the camera move distance in the positive view direction of the virtual camera which may be defined by the view direction of the user device 10 and which may result in changes of elevation of the view point or remain at a constant elevation as a previous view point as described in illustrative embodiments above.

At an act A50, the virtual scene is redrawn with the virtual camera located at the updated view point within the virtual scene.

The following describes control of the virtual camera within the virtual scene during navigation of a virtual model according to example embodiments herein. In one embodiment, the virtual camera has 6 degrees of freedom: 3 rotational and 3 translational and the virtual camera can be rotated about its X, Y, or Z axes, and it can be translated along its X, Y, or Z axes of the scene coordinate reference frame. The degrees of freedom of the virtual camera are controlled or manipulated by various combinations of traditional controls (joysticks, gestures, mouse movements, key presses, etc.) and natural movements (stepping, device rotation, etc.) in illustrative embodiments described herein.

For illustration purposes, the possible configuration for control of the virtual camera may be simplified to three different groupings of degrees of freedom: rotation about all 3 axes (R(x,y,z)), translation constrained to a plane (T(x,y)) wherein the virtual camera is positioned at a constant elevation in a scene, and translation along all 3 coordinate axes (T(x,y,z)). The controls may also be grouped into three categories: traditional (joysticks, gestures, mouse movements, key presses, etc.), natural translation (stepping or otherwise moving in the physical world), and natural rotation (rotating the user device as if it were the virtual camera). In some embodiments, R(x,y,z), T(x,y), and/or T(x,y,z) are controlled through traditional controls or R(x,y,z) is controlled through natural rotation of the user device, In another example embodiment, T(x,y) or T(x,y,z) are controlled through natural translation and any other method of controlling R(x,y,z). In another embodiment, R(x,y,z) is controlled using natural rotation of the user device combined with any control of translation. In yet another embodiment, natural rotation of the user device is used to control R(x,y,z) and traditional methods (e.g., joysticks) are used to control T(x,y,z) to produce the sensation of "flying" through the virtual scene. In another embodiment, T(x,y,z) is controlled using natural translation of the user device and the some angle given with respect to the XY plane (controlled through natural rotation or traditional controls) to produce a sense of the user growing or shrinking as the user navigates the model.

As described below in some embodiments, processing circuitry is configured to combine and integrate content from the physical world with content of a virtual scene to create views of the virtual model which also include content of the physical world. In one example, images (e.g., video of physical world content) generated by the camera 38 of the user device may be combined and integrated with virtual content within a virtual scene of the virtual model.

In one example discussed further below, video of the physical world may be shown within a translucent surface such as a window of the virtual model if the virtual camera is oriented to look through the surface in a given view (e.g., physical world content from the camera of the user device may be shown through a window of a virtual scene of the virtual model in the form of an architectural structure).

In one example for navigating virtual models in the form of architectural structures, the video camera image could be used and shown as the backdrop for the virtual scene and the virtual content of the virtual model may be overlaid or drawn on top of the backdrop and portions of the backdrop (i.e., physical world content in this example) are visible through translucent surfaces of the virtual content. Accordingly, when a view of the virtual model includes a translucent surface of virtual content (e.g., a virtual window), then image data from the camera 38 is visible through the window as the backdrop.

In some embodiments, the pixels which correspond to the translucent surfaces in a view of the virtual model are identified and image data from respective pixels of the physical world content generated by the camera 38 are visible at the identified pixels (e.g., if a pixel at a location x, y of the view of the virtual model is translucent, then the content of the pixel at the corresponding location x, y of the image data is visible at the location x, y of the view of the virtual model).

In some embodiments, the translucent surfaces may be transparent where the corresponding pixels of image data may be shown in the view without modification. In other embodiments, the pixels of image data may be altered to indicate the translucent nature of the surface.

In one embodiment, image data obtained from the camera of the user device is only shown at translucent surfaces at an outermost boundary or periphery of the virtual model. For example, the processing circuitry may determine that a translucent surface which is present in a given view is located at the outermost boundary of the virtual model, and in response thereto, control the image data of the physical world to be visible within the translucent surface in the view. Furthermore, virtual content of the virtual model (as opposed to image data from the camera of the user device) would be visible through translucent surfaces which are located within the interior of the virtual model (i.e., not at the periphery).

These described example embodiments provide the user with a perception of being located within the virtual model and seeing the physical world content through translucent surfaces at the periphery of the virtual model. Views of the virtual model as observed from view points which are inside of the virtual model are created and content of the physical world which is outside of the virtual model is visible in the created views of the virtual model in one embodiment. As mentioned above, virtual models of other subject matter may be navigated in other embodiments (e.g., a user may peer out of the eyes of a virtual model of a living organism in another illustrative example).

In one embodiment, the Unity graphics engine may be utilized to combine and integrate image content from the camera of the user device into a view of a virtual model. In one specific implementation, a background camera object is created using the graphics engine and several components are attached to this object. First, a script component is attached to the background camera object to allow custom implementations of the 'Start' and 'Update' functions with the Unity graphics engine. Second, a camera component is added to the background camera object which encapsulates information necessary to correctly render an image from the video camera 38 to the display screen.

For example, when the camera component is created, its 'depth' parameter is set to −1. This value is intended to be lower than the depth values for any other camera component in the scene which causes the pixels defined by the background camera object to be rendered to the screen display before any other camera object, effectively making the background camera object responsible for drawing the background image (the image that will appear behind all others) for the virtual scene, and accordingly, portions of the background image are visible through translucent surfaces present in a given view of the virtual model.

In addition, the 'Start' function of the background camera object in the Unity graphics engine contains code to iterate over all of the video cameras associated with the user device. Once a camera of the user device that is designated a rear facing camera (i.e., view direction of the camera which is the same as the view direction of the user device) is located by the graphics engine, the camera is turned on and the graphics engine stores a handle to it.

As mentioned above, the user device 10 defines a view direction which is normal to the plane of the display screen in one embodiment. The user device 10 may contain a plurality of cameras having view directions in different directions from the user device 10 (e.g., present in different sides of the user device). In one embodiment, a camera 38 of the user device which has a view direction in the same direction as the view direction of the user device is used to generate the physical world content for inclusion in the views of the virtual model.

The video image from the camera of the user device is then connected to a GUITexture object in the Unity graphics engine in one embodiment. A GUITexture is an image that always resides in the 2-dimensional plane of the screen. The GUITexture is associated with the background camera object which causes the background camera object to render image data from camera 38 of the user device to the display screen during frame updates.

The 'Start' function of the background camera object also contains logic to orient the image of camera 38 of the user device correctly based on current orientation of the display screen of the user device. For example, if an iOS based user device is oriented so that it is in 'landscape' orientation (as opposed to 'portrait' orientation) with the 'Home' button on the right, the image of the camera of the user device may be used without modification. If, however, the device is in landscape orientation with the 'Home' button on the left, the image of the camera of the user device is inverted so that it does not appear upside down. This orientation check and correction is performed at frame updates to account for device rotation between frames in one implementation.

It is desirable to fill the entire display screen 32 with pixels from the camera 38 as the backdrop and virtual content may be drawn over the backdrop in the desired embodiment. However, the resolution of the camera 38 of the user device doesn't necessarily match the resolution of the screen 32. The 'Update' function for the background camera object in the Unity graphics engine accommodates these differences.

If both axes of the camera of the user device contain the same number or more pixels than the display screen, the video image is simply clipped (cropped) to match the resolution of the screen. The Unity graphics engine performs this operation automatically as part of the rendering process. If the video image is smaller than the screen in either dimension, the video image is scaled so that it fills the display screen in one implementation. A scale factor is computed in the 'Update' function of the Unity graphics engine and the Unity graphics engine performs the necessary image processing operations to scale the image to fit the display screen in one implementation.

Displaying the feed from the camera 38 according to the above example implementation ensures that the image from the camera 38 is always shown as the backdrop for the scene. This produces the illusion that the user is looking through the view of the virtual model at the backdrop.

Figure 12:
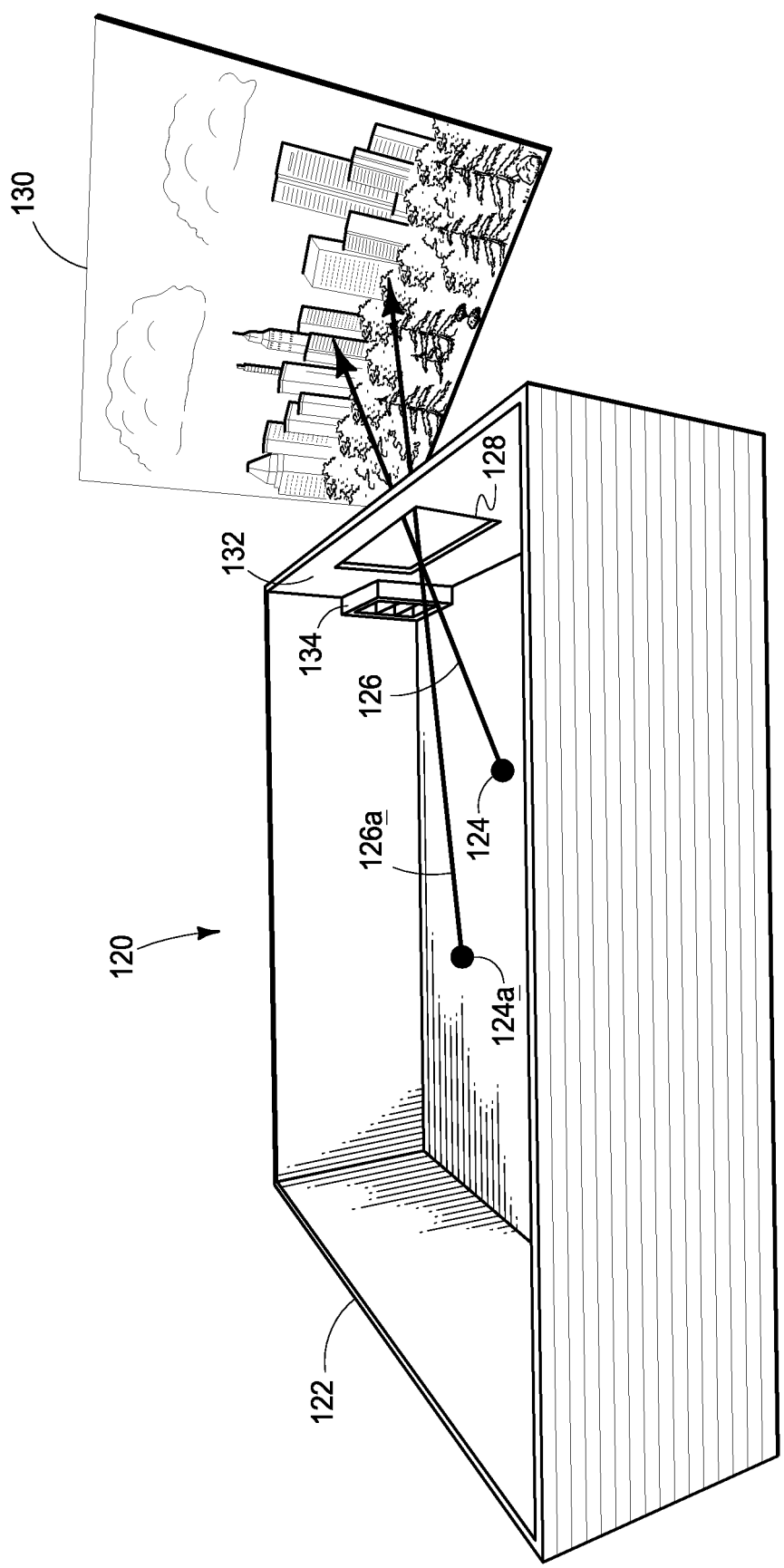
FIG. 12 is a perspective view of a virtual scene of a virtual model and a backdrop according to one embodiment.
Figure 13:
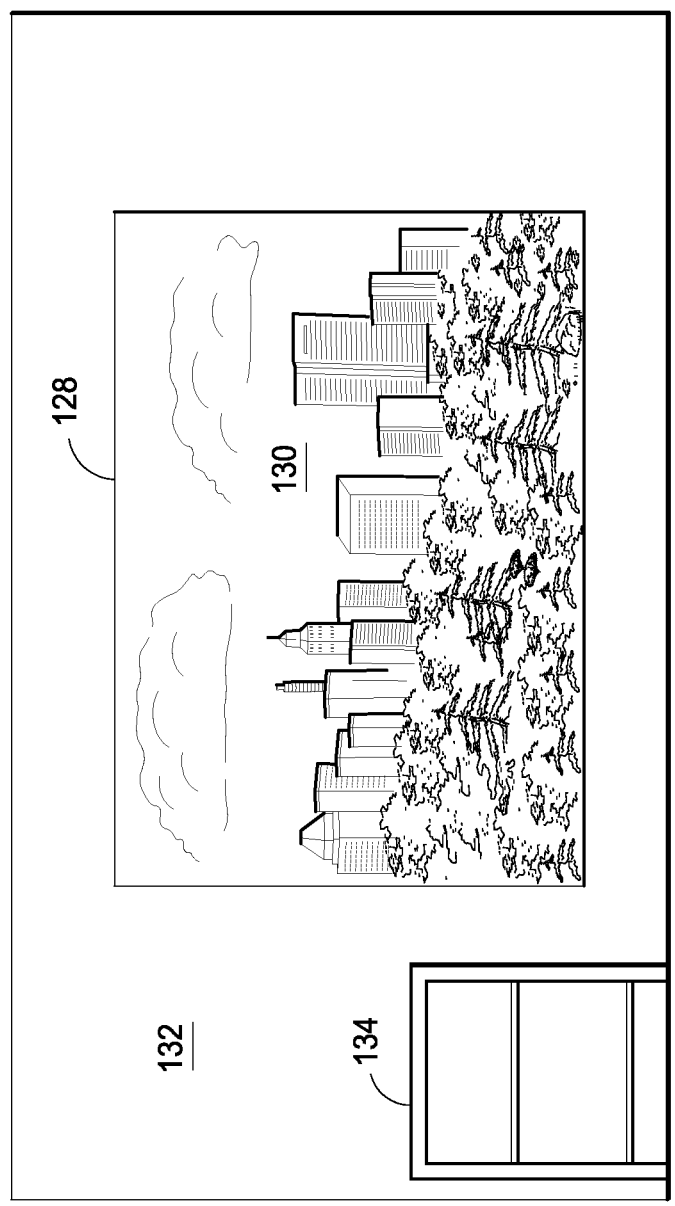
FIG. 13 is an illustrative representation of a view of a virtual scene including content of the physical world according to one embodiment.

Referring to FIG. 12, a virtual scene of an example virtual model 120 in the form of a simple architectural structure 122 is shown. In the depicted example, the virtual scene includes a virtual camera which is used to generate different views of the virtual model depending upon the view point and view direction of the virtual camera and the generated views may be displayed using the display screen of the user device as shown in FIG. 13.

In FIG. 12, virtual camera is shown at an initial location (i.e., view point) 124 within the virtual scene pointing in a view direction 126 within the virtual scene. In this example, the architectural structure 122 includes a translucent window 128. In this embodiment, image data from the camera of the user device (i.e., content of the physical world) is used to form a backdrop 130 within the virtual scene and portions of the backdrop 130 may be visible through the window 128 in different views which are generated of the virtual model.

For example, processing circuitry may access model data of the virtual model from appropriate storage circuitry to draw a view of the virtual model for a specified view point 124 and view direction 126 of the virtual camera within the virtual scene. In one embodiment, content of the physical world in the backdrop 130 may be shown through a translucent surface (e.g., window 128) overlaid upon the backdrop 130 within the view to be drawn. As mentioned above, camera 38 may generate video images of the physical world content, and the pixels of the backdrop 130 which correspond to the translucent surface within the view being drawn may change between different frames. In one embodiment, image data of the physical world content may be retrieved from video frames which correspond in real time such that current image data is shown in the view of the virtual model.

The Unity graphics engine combines and integrates the image data from the camera 38 of the user device into views of the virtual model in this example by showing respective portions of the image data content which would be visible through the window 128 corresponding to locations and view directions of the virtual camera. If the window 128 is within a view of the virtual model according to a location and view direction of the virtual camera at a given moment in time, then image data content of the backdrop 130 which corresponds to portions of the backdrop 130 which are visible through the window 128 given the location and view direction of the virtual camera at the given moment in time are combined and integrated with content of the virtual model to be visible through the window 128 while the remaining portions of the virtual scene would include content of the wall 132 of the architectural structure 122.

As described above, different inputs (e.g., via user controls or sensors of the user device) may be used to change one or more of the view point and/or view direction of the virtual camera between views of the virtual model. In the illustrated example, the virtual camera has been moved to a new location 124*a* and points in a different view direction 126*a* at a subsequent moment in time compared with initial location 124 and initial view direction 126. Different views of the virtual model are generated and displayed using the display screen 32 corresponding to the different view points 124, 124*a* and view directions 126, 126*a*. In addition, different portions of the backdrop 130 would be shown in the different views generated by the virtual camera at the different view points 124, 124*a* and pointing in the different view directions 126, 126*a*.

Referring to FIG. 13, a view of the virtual model which may be generated by the virtual camera positioned and oriented in accordance with one of the examples shown in FIG. 12 is displayed on the display screen 32 of the user device. The virtual scene includes virtual content (i.e., the wall 132 of the virtual model which overlies respective portions of the backdrop) and content of the physical world in the form of the image data utilized as the backdrop 130 and which is visible through a translucent surface of the virtual model (i.e., window 128).

In one embodiment, the field of view (FOV) of the virtual camera is configured to correspond to the field of view of the camera 38 of the user device to create a realistic experience for the user when image data of the user camera is included in a virtual scene. Otherwise, the user experience may be negatively impacted.

For example, if the virtual camera's FOV is larger than the FOV of the camera of the user device, the image data of the backdrop will appear too close in the virtual scene. In one more specific example embodiment, FOV parameters of the virtual camera are set to be the same as the corresponding FOV parameters of the camera 38 of the user device.

The field of view (FOV) parameters of the camera 38 are typically fixed by the hardware and designed to match the aspect ratio of the display screen 32 of the user device in a particular orientation. In one embodiment, the field of view parameters to be utilized for the virtual camera may be specified in the Unity graphics engine.

The FOV parameters may be different on various types of cameras used in user devices. Accordingly, in at least one operational method, information of these FOV parameters of the camera 38 of the user device being utilized may be obtained at run time in different ways.

In example implementations, the FOV parameters of the camera 38 of the user device can be obtained by querying the API of the user device, reading the device's hardware specifications, experimentation, or reading a data table of parameters for different video cameras or user devices stored within the storage circuitry of the user device. Once the FOV parameters of the hardware configuration of camera 38 are obtained, they may be used to configure the field of view of the virtual camera to match the field of view of camera 38 being used by the user device 10. Images produced from both cameras (virtual camera and camera 38) can be integrated seamlessly once the virtual camera's FOV parameters are matched to the camera 38 of the user device.

In compliance with the statute, the invention has been described in language more or less specific as to structural and methodical features. It is to be understood, however, that the invention is not limited to the specific features shown and described, since the means herein disclosed comprise preferred forms of putting the invention into effect. The invention is, therefore, claimed in any of its forms or modifications within the proper scope of the appended aspects appropriately interpreted in accordance with the doctrine of equivalents.

Further, aspects herein have been presented for guidance in construction and/or operation of illustrative embodiments of the disclosure. Applicant(s) hereof consider these described illustrative embodiments to also include, disclose and describe further inventive aspects in addition to those explicitly disclosed. For example, the additional inventive aspects may include less, more and/or alternative features than those described in the illustrative embodiments. In more specific examples, Applicants consider the disclosure to include, disclose and describe methods which include less, more and/or alternative steps than those methods explicitly disclosed as well as apparatus which includes less, more and/or alternative structure than the explicitly disclosed structure.

What is claimed is:

1. A footstep detection method comprising:
   using an accelerometer sensor, generating accelerometer data regarding movements of a user device;
   using a filter, filtering the accelerometer data to remove frequencies above a typical stepping frequency range of a user;
   using processing circuitry, analyzing an individual one of a plurality of cycles of the accelerometer data to determine whether the one cycle corresponds to the user taking a footstep with the user device after the filtering;
   using the processing circuitry, determining that the one cycle corresponds to the user taking the footstep as a result of the analyzing; and
   wherein the determining comprises:
      determining the one cycle as corresponding to the user taking the footstep as a result of the accelerometer data of the one cycle decreasing while first crossing a low threshold and increasing while second crossing a high threshold, and the first and second crossings occur within a cutoff period of time; or
      determining the one cycle as corresponding to the user taking the footstep as a result of the accelerometer data of the one cycle decreasing while third crossing the high threshold and increasing while fourth crossing the low threshold, and the third and fourth crossings occur within the cutoff period of time.

2. The method of claim 1 wherein the analyzing comprises analyzing less than the entirety of the one cycle.

3. The method of claim 2 wherein the analyzing comprises comparing only a portion of the one cycle with a predefined length of time.

4. The method of claim 1 wherein the analyzing filters cycles having frequencies less than the typical stepping frequency range.

5. The method of claim 1 wherein the cutoff period of time is longer than half the period of a typical footstep cycle of the user and less than the period of a typical footstep cycle which corresponds to a footstep of the user.

6. The method of claim 1 wherein the filtering comprises filtering using a digital Finite Impulse Response filter.

7. The method of claim 6 wherein the digital Finite Impulse Response Filter employs a 16-element coefficient vector to perform the filtering.

8. The method of claim 7 wherein the filtering the accelerometer data comprises low passing frequencies below 4 Hz.

9. The method of claim 8 wherein the analyzing the accelerometer data comprises high pass filtering the accelerometer data.

10. The method of claim 9 where the high pass filtering comprises filtering with a high pass filter having an infinitely small transition zone.

11. The method of claim 10 wherein the filtering and analyzing band pass filter the accelerometer data about the typical stepping frequency range of 1-4 Hz.

12. The method of claim 1 wherein the accelerometer sensor is configured to provide the accelerometer data from one of a plurality of axes of a device coordinate reference frame of the user device.

13. The method of claim 12 wherein the acceleration data only comprises acceleration information regarding the stepping of the user in a Z axis of a global coordinate reference frame.

14. The method of claim 12 wherein the analyzing comprises analyzing using only the accelerometer data in a Z axis of a global coordinate reference frame.

15. The method of claim 1 wherein the analyzing identifies the one cycle as corresponding to the user taking a footstep as a result of the accelerometer data of the one cycle having an amplitude which is less than a threshold amplitude which is indicative of a typical footstep.

16. The method of claim 15 further comprising determining the amplitude of the one cycle while the accelerometer data is decreasing and prior to the increasing of the accelerometer data.

17. The method of claim 16 wherein the determining comprises determining an absolute value of a minimum acceleration since the accelerometer data last crossed 0.0 g while decreasing.

18. The method of claim 1 wherein the analyzing identifies an other of the cycles as not corresponding to the user taking a footstep as a result of the accelerometer data of the other cycle having an amplitude which is larger than a threshold amplitude which is indicative of a typical footstep.

19. The method of claim 1 further comprising determining a distance a virtual camera is to be moved within a virtual scene of a virtual model as a result of the determining that the one cycle corresponds to the user taking the footstep.

20. The method of claim 1 further comprising moving a virtual camera within a virtual scene of a virtual model as a result of the determining that the one cycle corresponds to the user taking the footstep.

21. The method of claim 20 wherein the moving comprises initiating the moving after the determining and prior to determining that an other cycle of the accelerometer data corresponds to the user taking another footstep.

22. The method of claim 1 further comprising generating an indication that the one cycle corresponds to the user taking the footstep.

23. The method of claim 1 further comprising initiating an operation of a user computer device as a result of the determining that the one cycle corresponds to the user taking the footstep.

24. The method of claim 1 wherein the analyzing and determining occur in real-time as the user takes the footstep.

25. The method of claim 1 wherein the filtering comprises first filtering and the analyzing comprises second filtering the accelerometer data.

26. The method of claim 1 wherein the analyzing comprises analyzing a period of the one cycle with respect to a period of a typical footstep cycle which corresponds to a typical footstep.

27. The method of claim 26 wherein the determining comprises determining the one cycle as corresponding to the user taking the footstep as a result of the period of the one cycle being less than the period of the typical footstep cycle.

28. The method of claim 26 further comprising identifying an other of the cycles as not corresponding to the user taking the footstep as a result of a period of the other of the cycles being greater than the period of the typical footstep cycle.

29. A user computer device configured to perform the footstep detection method of claim 1.

30. An article of manufacture comprising programming configured to cause the processing circuitry to perform the method of claim 1.

* * * * *